US012689301B2

(12) United States Patent
Aso

(10) Patent No.: US 12,689,301 B2
(45) Date of Patent: Jul. 21, 2026

(54) ACTIVE CLAMP FLYBACK CONVERTER

(71) Applicant: SANKEN ELECTRIC CO., LTD.,
Niiza (JP)

(72) Inventor: Shinji Aso, Niiza (JP)

(73) Assignee: SANKEN ELECTRIC CO., LTD.,
Niiza-Shi (JP)

( * ) Notice: Subject to any disclaimer, the term of this
patent is extended or adjusted under 35
U.S.C. 154(b) by 219 days.

(21) Appl. No.: 18/796,555

(22) Filed: Aug. 7, 2024

(65) Prior Publication Data

US 2024/0396460 A1 Nov. 28, 2024

Related U.S. Application Data

(63) Continuation of application No.
PCT/JP2022/007531, filed on Feb. 24, 2022.

(51) Int. Cl.
*H02M 3/335* (2006.01)
*H02M 1/00* (2006.01)
*H02M 3/00* (2006.01)

(52) U.S. Cl.
CPC ..... *H02M 3/33569* (2013.01); *H02M 1/0009*
(2021.05); *H02M 3/01* (2021.05)

(58) Field of Classification Search
CPC .... H02M 3/33507; H02M 3/01; H02M 3/315;
H02M 3/3155; H02M 3/335; H02M
3/33515; H02M 3/33523; H02M 3/33553;
H02M 3/33561; H02M 3/33569; H02M
3/015; H02M 1/0009; H02M 1/0003;
H02M 1/348; H02M 1/34; H02M 1/342;
H02M 1/344; H02M 1/0058
See application file for complete search history.

(56) References Cited

U.S. PATENT DOCUMENTS

2008/0013346 A1    1/2008  Westmoreland et al.
2017/0264206 A1*   9/2017  Rana ................. H02M 3/33569
2019/0229624 A1*   7/2019  Liu .................... H02M 3/33507
2020/0395859 A1*  12/2020  Watanabe ............... H02M 1/34

FOREIGN PATENT DOCUMENTS

CN      110912414 A     3/2020
CN      112510976 A     3/2021
JP      2000-92829 A    3/2000
WO      2021/042812 A1  3/2021

OTHER PUBLICATIONS

The International Search Report of PCT/JP2022/007531 mailed on
Apr. 12, 2022.

* cited by examiner

*Primary Examiner* — Nguyen Tran

(74) *Attorney, Agent, or Firm* — METROLEX IP LAW
GROUP, PLLC; Robert L. Scott, Esq.

(57) ABSTRACT

An active clamp fly-back converter is disclosed that includes
a main switch electrically connected to one end of the DC
power supply, a primary winding electrically connected in
series with the main switch, a clamp switch electrically
connected in series with the main switch, a clamp capacitor
electrically connected in series with the clamp switch, a
controller that controls the main switch and the clamp
switch. The controller turns on and off a clamp switch two
times by two pulses during off-period of the main switch.

12 Claims, 16 Drawing Sheets

FIG. 12

ACTIVE CLAMP FLYBACK CONVERTER

CROSS REFERENCE TO RELATED APPLICATIONS

This application is a continuation application of International Application No. PCT/JP2022/007531, filed on Feb. 24, 2022, the entire contents of which are incorporated herein by reference.

BACKGROUND

The disclosure relates to an active clamp flyback converter.

Active clamp flyback converters are described, for example, in the Chinese Patent Application Publication CN112510976 (Patent Document 1).

In the active clamp flyback converter disclosed in Patent Document 1, a series circuit having a transformer primary winding and a main switch is connected to a DC power supply. At both ends of the transformer primary winding, a series circuit with a clamp switch and a clamp capacitor is connected. The transformer secondary winding is connected to a series circuit of a rectifier and an output capacitor. In order to facilitate the explanation of the current path flowing through the leakage inductance and the excitation inductance, the transformer has an excitation inductance LM of the primary winding and a secondary winding, a leakage inductance LK, a primary winding Np, and a secondary winding Ns. Between the primary windings, a series circuit of leakage inductance LK and excitation inductance LM of the primary and secondary windings is connected. In the Patent Document 1, it is described in an equivalent circuit in which the secondary winding Np of the ideal transformer is connected to the inductance LM, and the secondary winding Ns of the ideal transformer is connected between the secondary windings.

The main switch operates on and off while adjusting the on-time of the main switch based on the output voltage of the output capacitor. When the main switch is on, a positive current is passed through the excitation inductance, positive magnetic energy is stored in the core of the transformer, and the magnetic energy accumulated in the core of the transformer during the off period is output as a current from the secondary winding to the output capacitor, and power is transmitted from the primary side of the transformer to the secondary side.

However, when the main switch is on, magnetic energy is also stored in the leakage inductance. Unlike the magnetic energy stored in the excitation inductance after the main switch is turned off, the magnetic energy is stored in the direction of reverse biasing the secondary side diode, so it cannot be directly output to the secondary side. Therefore, the magnetic energy stored in the leakage inductance is transferred to the clamp capacitor.

In Patent Document 1, the first ON of the clamp switch is set after the main switch is turned off. Immediately after the main switch is turned off, the first ON of the clamp switch is set to t1~t2 during the period when the magnetic energy stored in the leakage inductance is flowing as a current to the clamp capacitor via the clamp switch.

The first ON of the clamp switch does not need to be turned on when the main switch is an element with a body diode such as a MOS-FET. However, by making the on-resistance of the clamp switch a sufficiently small element, the resistance loss due to the on-resistance is sufficiently smaller than the loss of the forward voltage drop of the body diode of the clamp switch. For this reason, by setting the first ON, the loss of the clamp switch is reduced, and a high-efficiency power supply may be configured.

In the second ON of the clamp switch, all the magnetic energy accumulated in the excitation inductance when the main switch is turned on is discharged to the secondary side. Thereafter, the voltage across both sides of the clamp switch resonates at voltage, and when it becomes zero again, it is turned on at t3. The second on-period of the clamp switch is set to flow the excitation current in the negative direction. The second on-period of the clamp switch is set so that the energy stored in the excitation inductance is greater than the energy stored in the parasitic capacitance or floating capacitance that is equally connected to both ends of the main switch.

When the second ON of the clamp switch is over and the clamp switch is turned off, the energy stored in the excitation inductance discharges the capacitance that is equally connected to both ends of the main switch, reducing the voltage on both side of the main switch to zero volts.

After the voltage of the main switch becomes zero volts, the excitation current flows through the body diode of the main switch, so that when the main switch is turned on during the period flowing to the body diode, a zero volt and zero current switch may be realized. Since the switching loss of the main switch is greatly reduced, a power supply with higher efficiency and lower noise than a conventional flyback converter may be achieved.

However, in the technology disclosed in Patent Document 1, the rectifier on the secondary side is synchronously rectified, making it difficult to further improve efficiency.

In the control of the clamp switch of Patent Document 1, the operating waveforms including the current waveforms of each element are shown in FIGS. 18 and 19, and the difficulties thereof is described.

In the control of the clamp switch of Patent Document 1, the first ON is set during the period during which the energy stored in the leakage inductance is flowing in the path of the leakage inductance→the clamp switch→the clamp capacitor→the leakage inductance after the main switch is turned off.

After the main switch is turned off, the current of the excitation inductance flows to the secondary side, and a back electromotive force $N \cdot Vo$ (N is the turns ratio of the primary and secondary windings, and Vo is the output voltage) is generated in the primary winding Np. Therefore, when the first turn ON of the clamp switch is completed, the voltage of the clamp capacitor is charged a larger voltage α by a voltage stored in the leakage inductance than the back electromotive force $N \cdot Vo$, and the voltage becomes $N \cdot Vo + \alpha$.

Thereafter, all the energy of the excitation inductance is discharged from the secondary winding of the transformer to the secondary side, and after voltage resonance operation, the second ON of the clamp switch is started at zero volts of the clamp switch. Since the voltage of the clamp capacitor remains $N \cdot Vo + \alpha$, a voltage of $N \cdot Vo + \alpha$ is applied to the primary winding of the transformer at the second ON of the clamp switch, and a voltage of $Vo + \alpha/N$ is induced in the secondary winding, so when α/N is greater than the forward voltage Vf of the secondary diode, the resonant current of the resonant period Taclk of the clamp capacitor and leakage inductance flows in the path of the clamp capacitor→clamp switch→transformer primary winding→the clamp capacitor.

The resonant current flowing through the primary winding flows as a resonant current W2 in the path of the secondary winding→diode→output capacitor→the secondary winding.

At this time, since a voltage of N/Vo is applied to the primary winding, a current ILM of N·Vo/Lm·Ton2 flows in the negative direction to the excitation inductance in Ton2 during the period when the clamp switch is turned on, and a current of W1 flows through the clamp switch.

Therefore, a triangular wave current like a flyback converter flows through the diode on the secondary side after the main switch is turned off, and then a resonant current W2 flows again at the second ON of the clamp switch.

Further, the resonant current W2 is zero within the Ton2 period when the on-time Ton2 of the second ON of the clamp switch is Taclk/2 or higher, but when Ton2 is Taclk/2 or less, the resonant current is turned off at high speed as shown in W2 in FIG. 19.

Therefore, when the diode on the secondary side is a synchronous rectification method, the following problems occur, making synchronous rectification difficult.

As shown in FIGS. 18 and 19, since a current flows through the synchronous rectifier twice in one period, the synchronous rectifier needs to be turned on/off twice in one period, so that the drive loss increases by double.

As shown in W2 in FIG. 19, since the di/dt in which the resonant current is turned off is large, a high-performance synchronous rectification controller that can control the turn-off of the synchronous rectifier at high speed is required, however, it may be difficult to realize such a high performance synchronous rectification controller.

SUMMARY

An active clamp flyback converter according to one or more embodiments may include a main switch electrically connected to one end of the DC power supply, a primary winding electrically connected in series with the main switch, a clamp switch electrically connected in series with the main switch, a clamp capacitor electrically connected in series with the clamp switch, a controller that controls the main switch and the clamp switch. In one or more embodiments, the controller may perform operations including controlling the first on-signal that controls the main switch, the second on-signal that controls the clamp switch during the period when the main switch is off, and the third on-signal that controls the clamp switch again after the second on-signal, setting an on-timing in which a resonance current flowing in a direction of charging the clamp capacitor is reversed after a lapse of a half cycle time of a resonance cycle of the resonance circuit of the clamp capacitor and leakage inductance, which is generated when the clamp switch is turned on, is limited by an excitation current of the excitation inductance of the primary winding, setting the on-period of the second on-signal to a half or more of the resonance period so that the resonant current discharging the clamp capacitor and the resonant current inverted and the current limited by the excitation current charge and discharge the clamp capacitor once when the clamp switch is turned on, outputting the third on-signal after the excitation current of the excitation inductance is zero while controlling the clamp switch by the second on-signal, and controlling a negative current flowing through the excitation inductance while turning on the clamp switch by the third on-signal.

4

Figure 2:
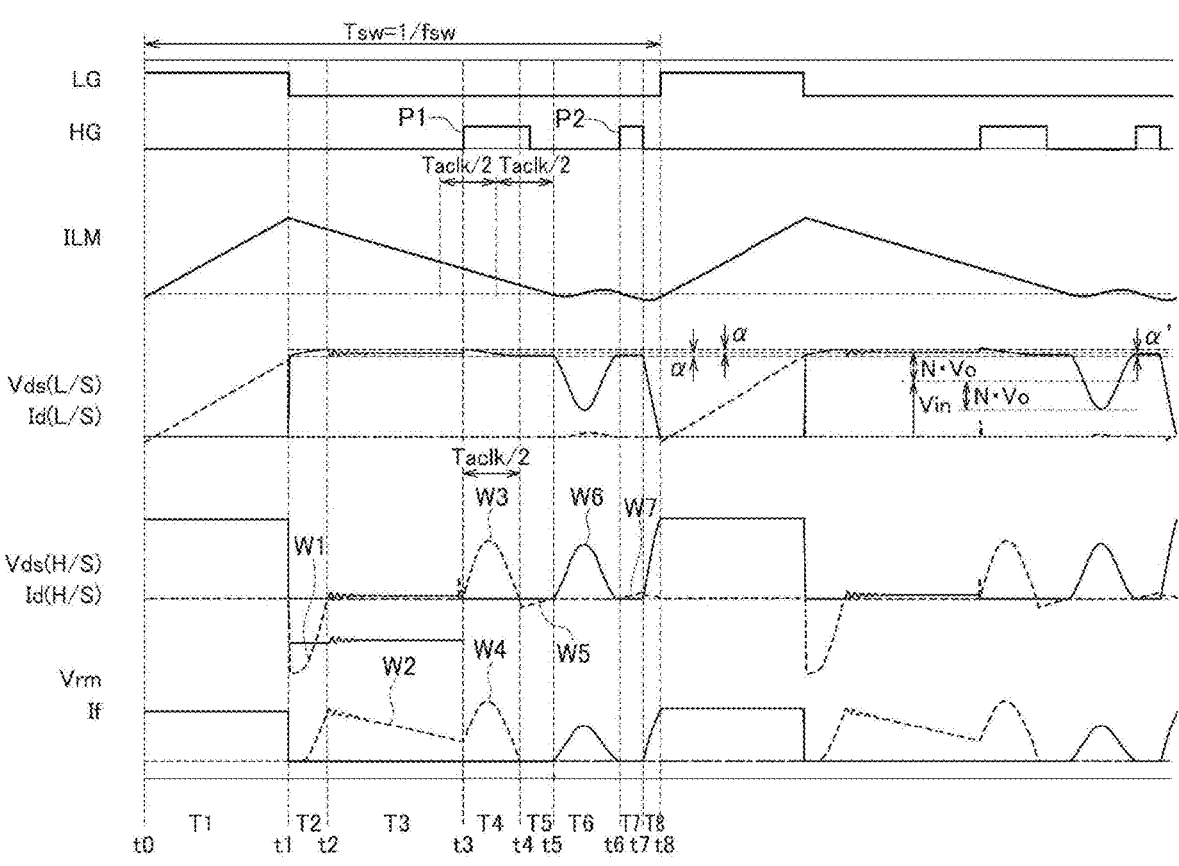

FIG. 2 is a diagram illustrating a first operating waveform of an active clamp flyback converter according to a first embodiment.

Figure 3:
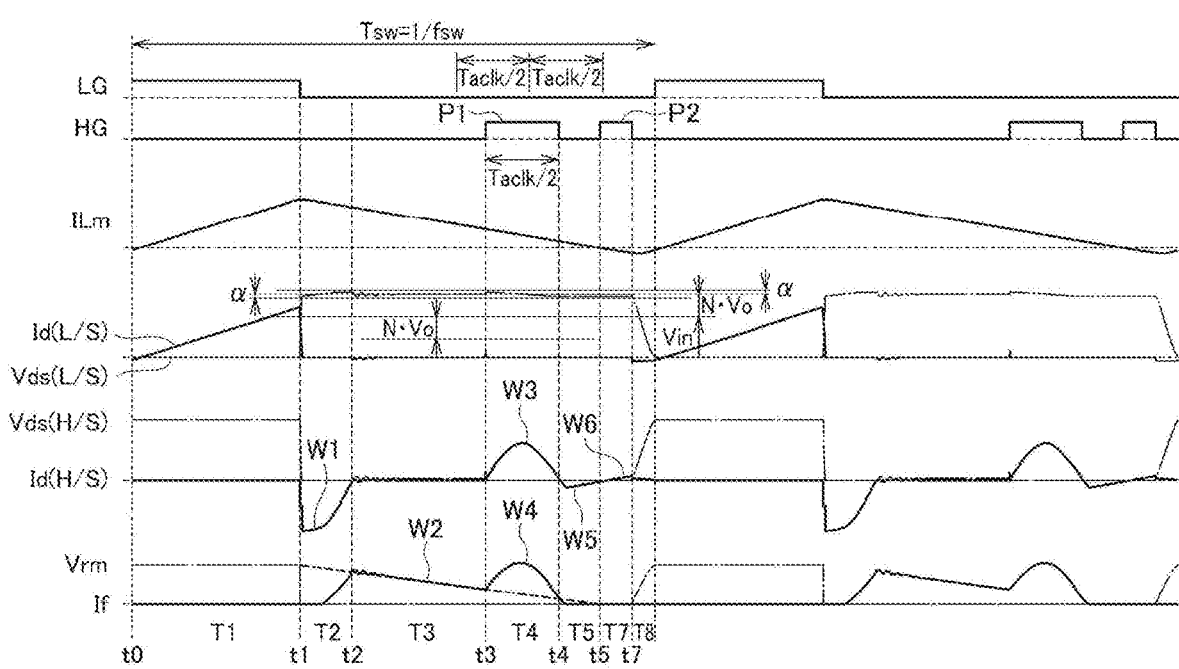

FIG. 3 is a diagram illustrating a second operating waveform of an active clamp flyback converter according to a first embodiment.

Figure 4:
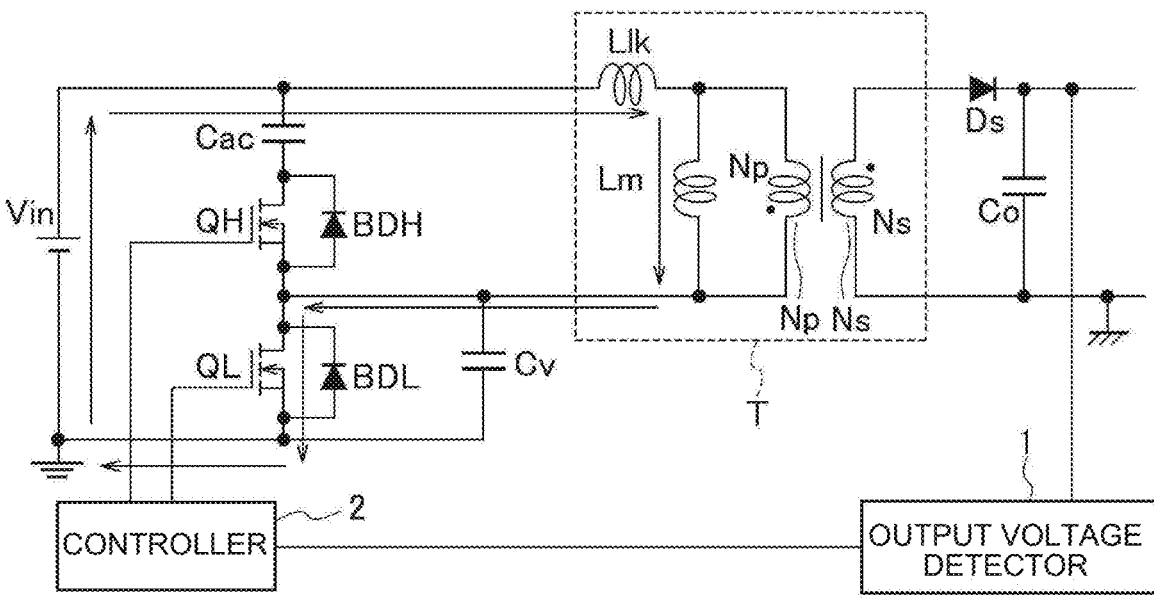

FIG. 4 is a diagram illustrating a current path of the period T1 of an active clamp flyback converter according to a first embodiment.

Figure 5:
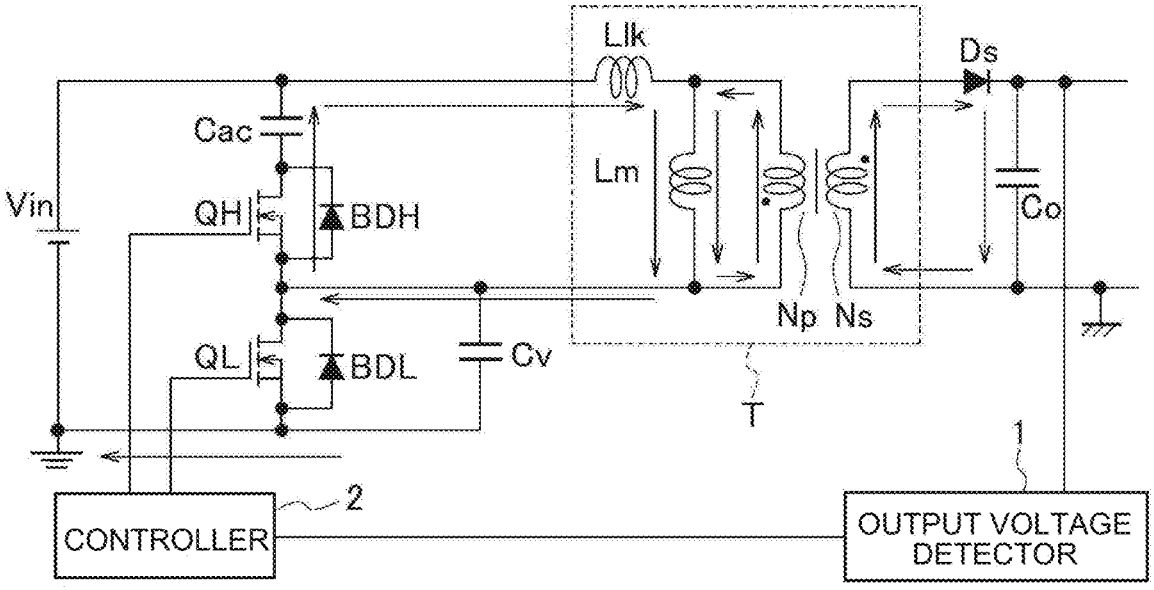

FIG. 5 is a diagram illustrating a current path of the period T2 of an active clamp flyback converter according to a first embodiment.

Figure 6:
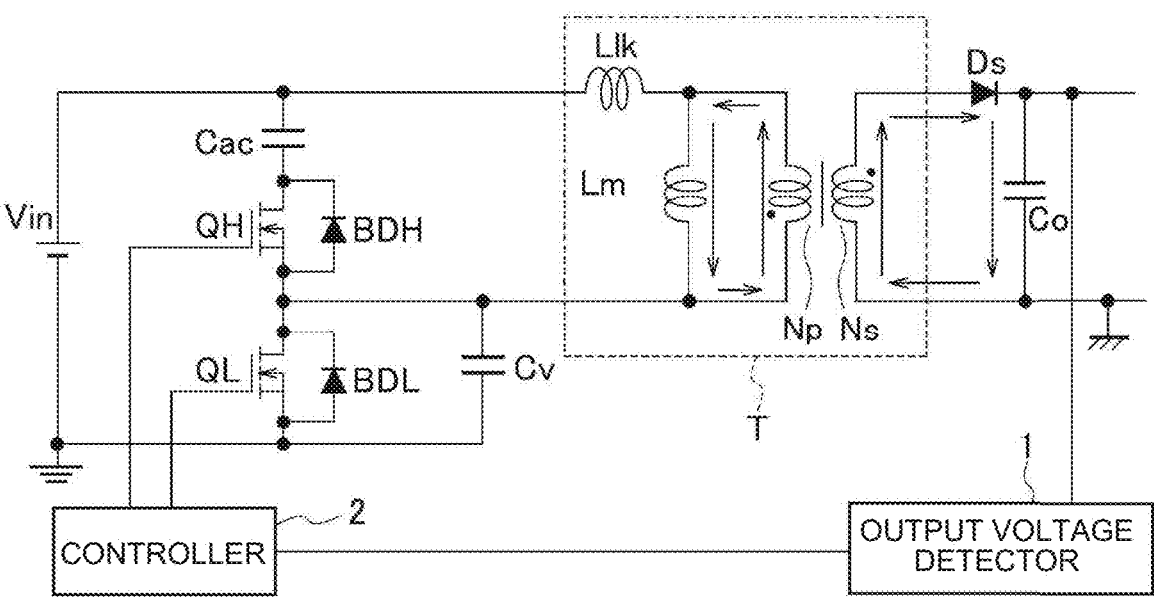

FIG. 6 is a diagram illustrating a current path of the period T3 of an active clamp flyback converter according to a first embodiment.

Figure 7:
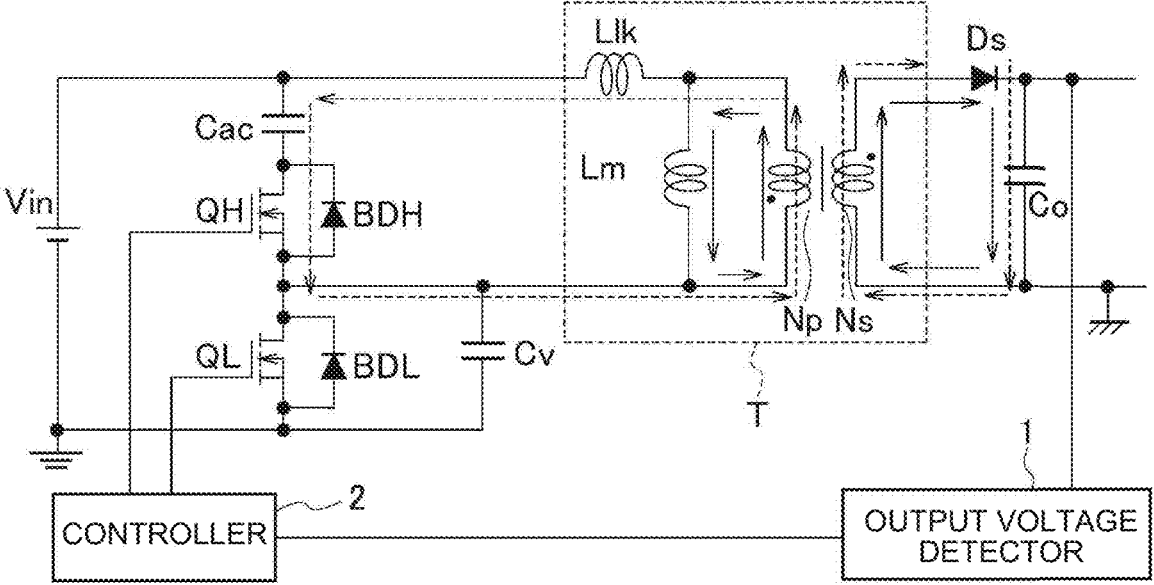

FIG. 7 is a diagram illustrating a current path of the period T4 of an active clamp flyback converter according to a first embodiment.

Figure 8:
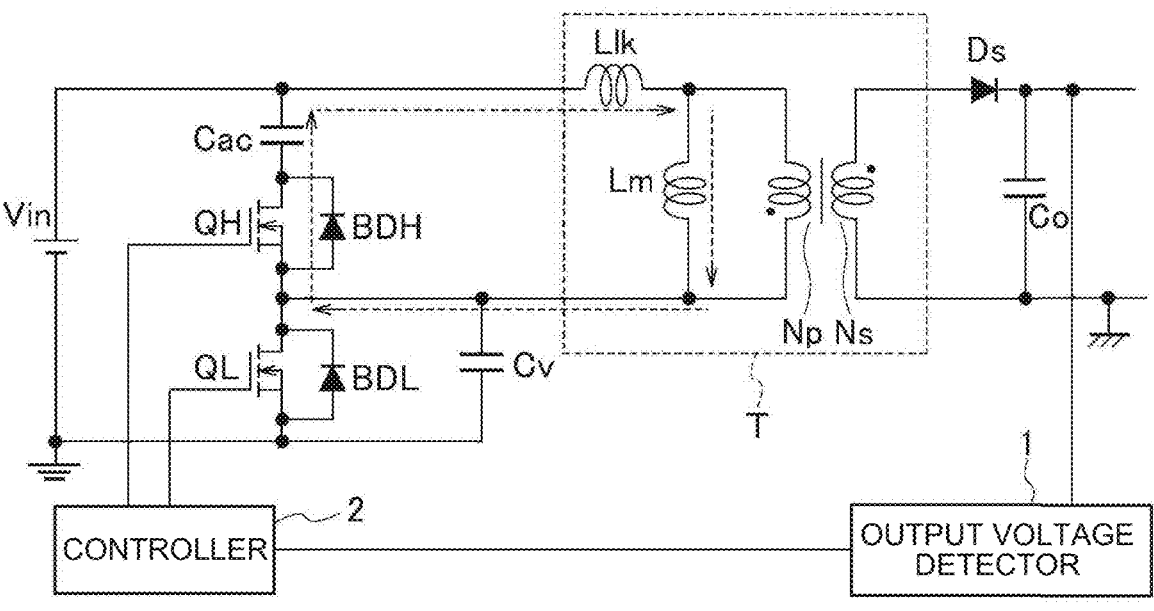

FIG. 8 is a diagram illustrating a current path of the period T5 of an active clamp flyback converter according to a first embodiment.

Figure 9:
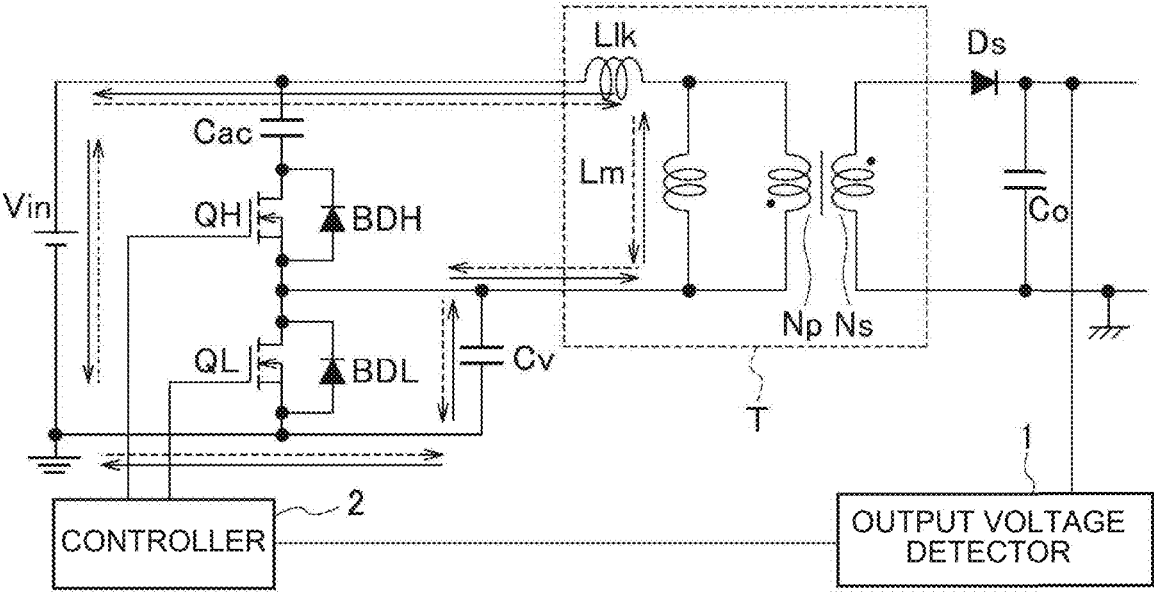

FIG. 9 is a diagram illustrating a current path of the period T6 of an active clamp flyback converter according to a first embodiment.

Figure 10:
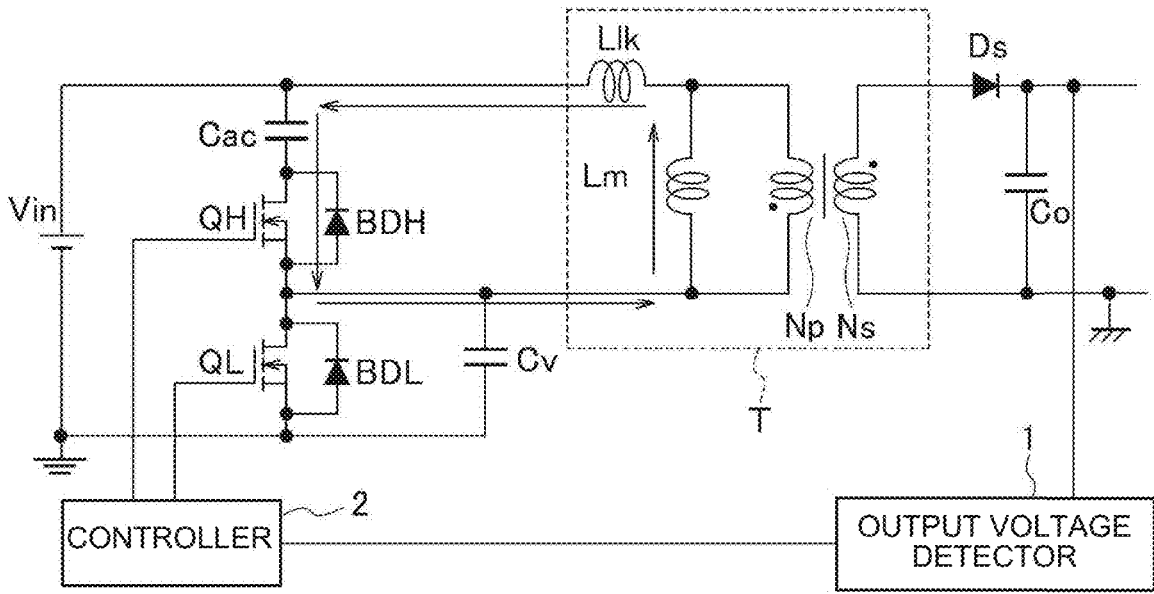

FIG. 10 is a diagram illustrating a current path of the period T7 of an active clamp flyback converter according to a first embodiment.

Figure 11:
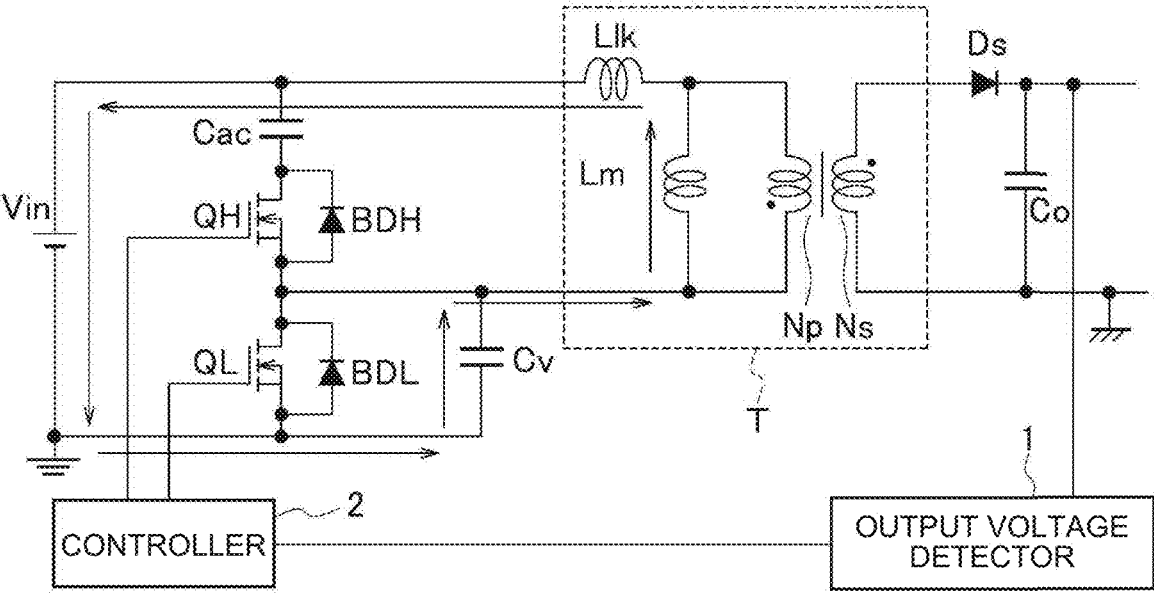

FIG. 11 is a diagram illustrating a current path of the period TB of an active clamp flyback converter according to a first embodiment.

Figure 12:
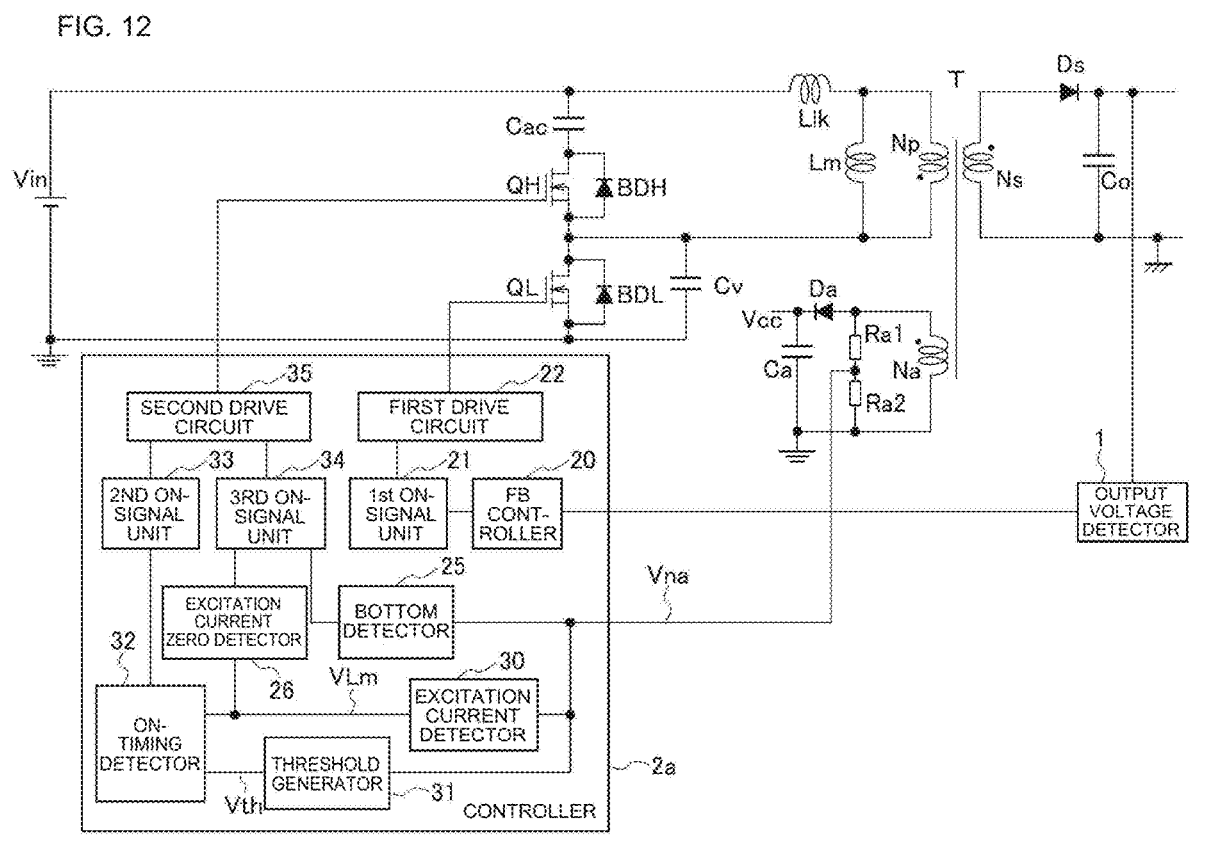

FIG. 12 is a diagram illustrating a specific example of an active clamp flyback converter according to a first embodiment.

Figure 13:
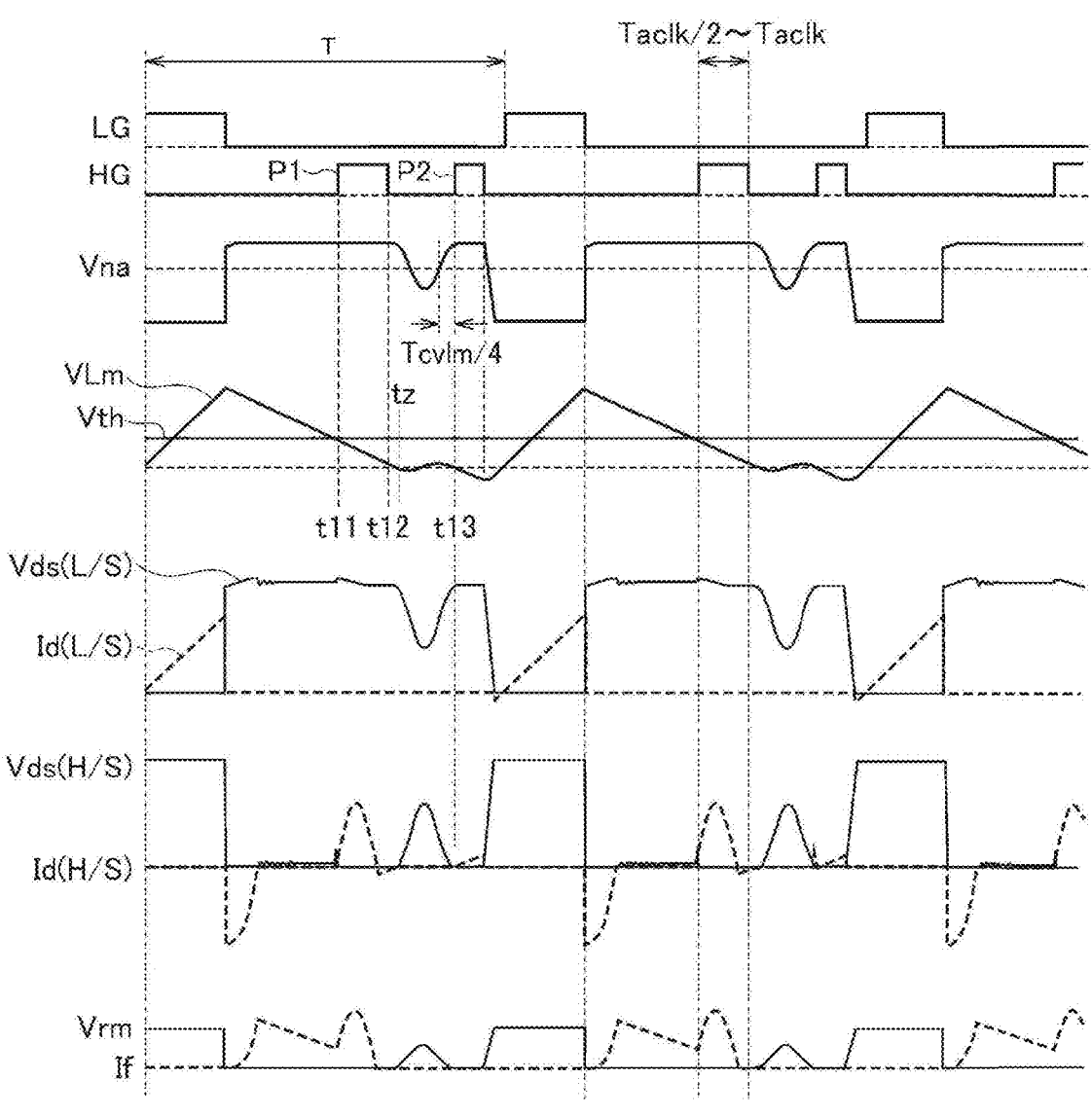

FIG. 13 is a diagram illustrating a first operating waveform of an active clamp flyback converter shown in FIG. 12.

Figure 14:
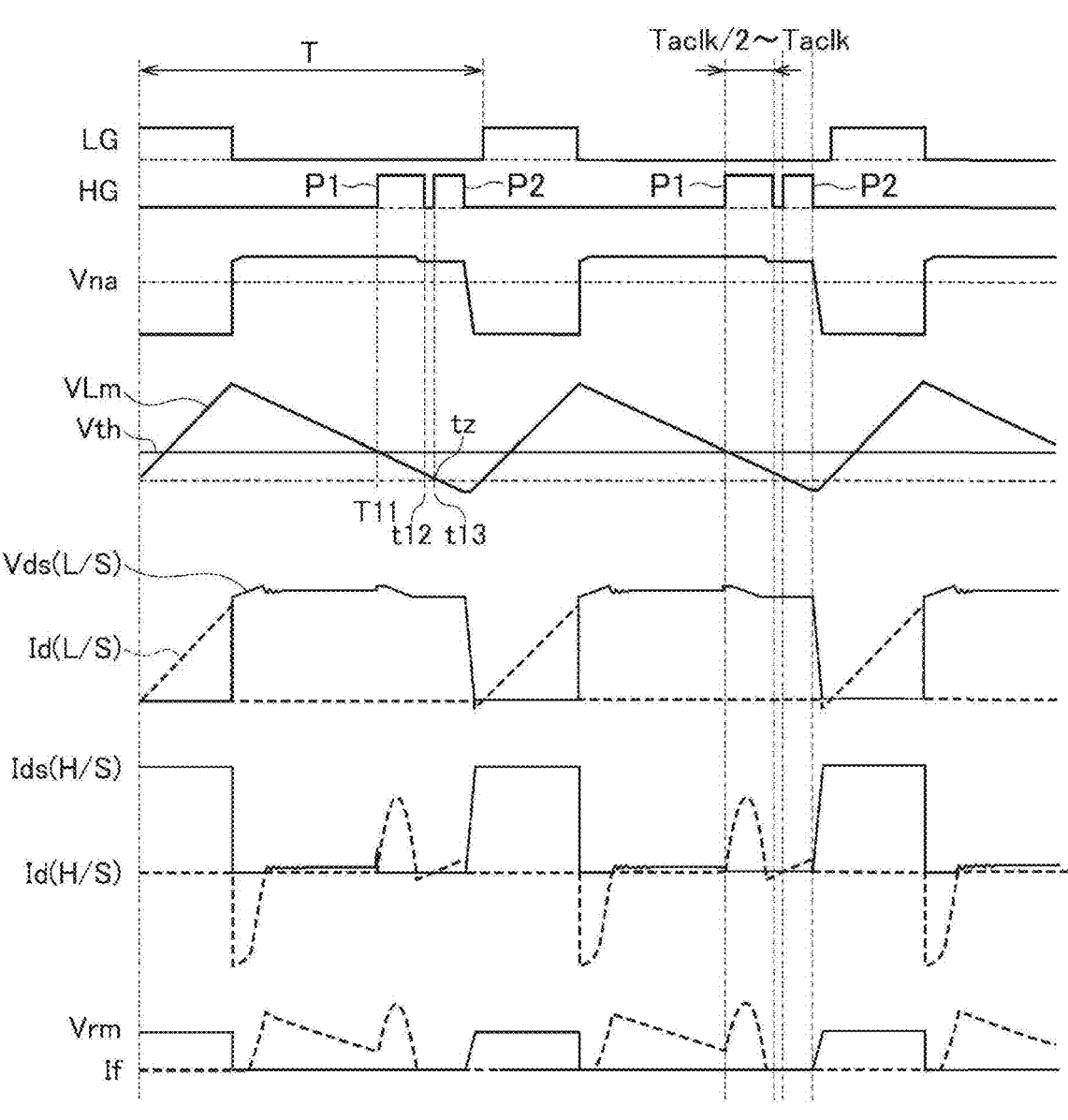

FIG. 14 is a diagram illustrating a second operating waveform of an active clamp flyback converter shown in FIG. 12.

Figure 15:
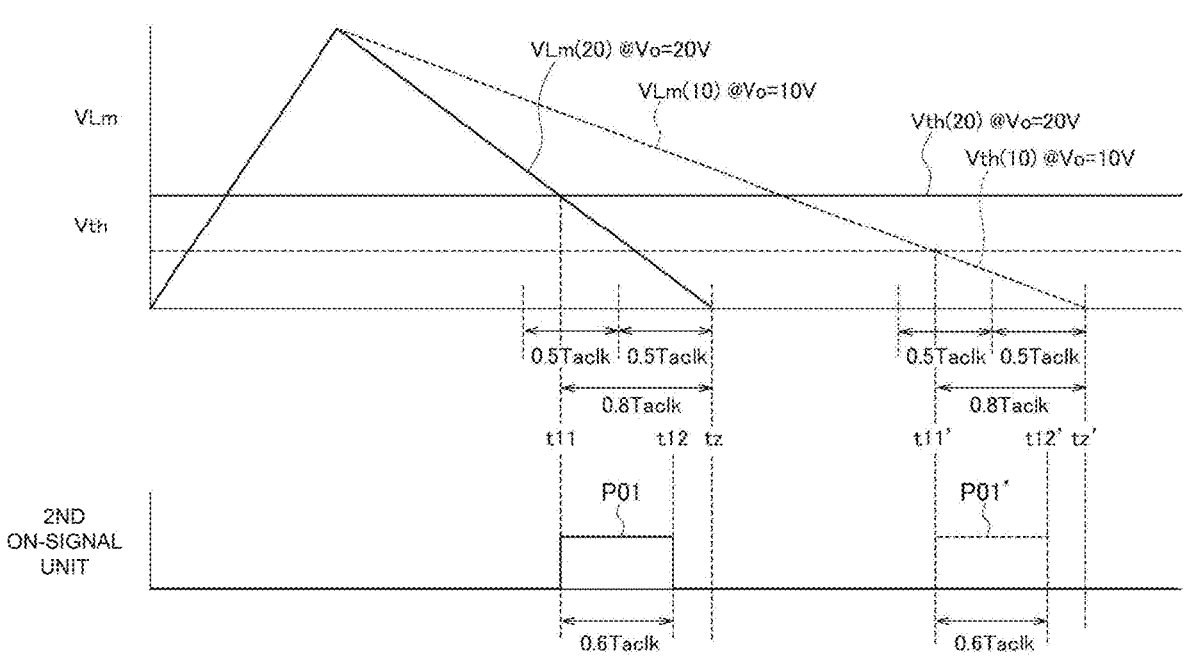

FIG. 15 is a diagram illustrating an operation waveform of the on-timing detector 32 and the second on-signal unit of a specific example of an active clamp flyback converter according to a first embodiment shown in FIG. 12.

Figure 16:
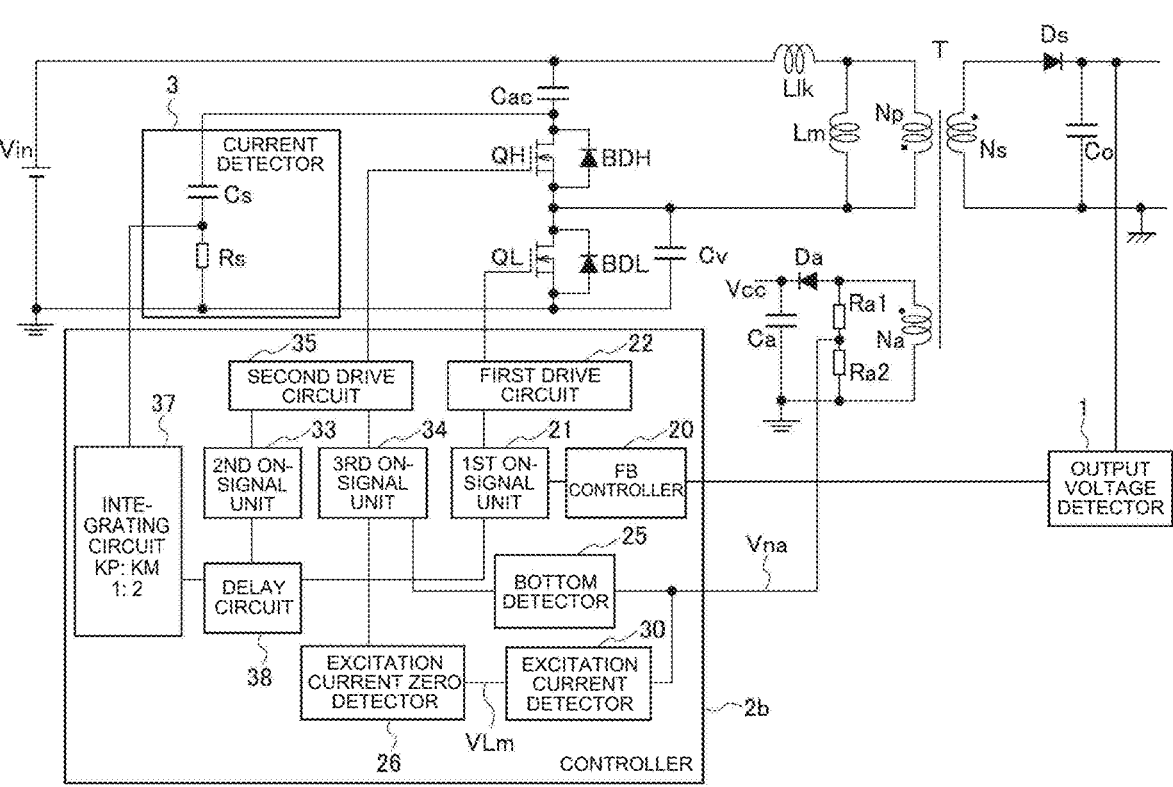

FIG. 16 is diagram illustrating a configuration of an active clamp flyback converter according to a second embodiment.

Figure 17:
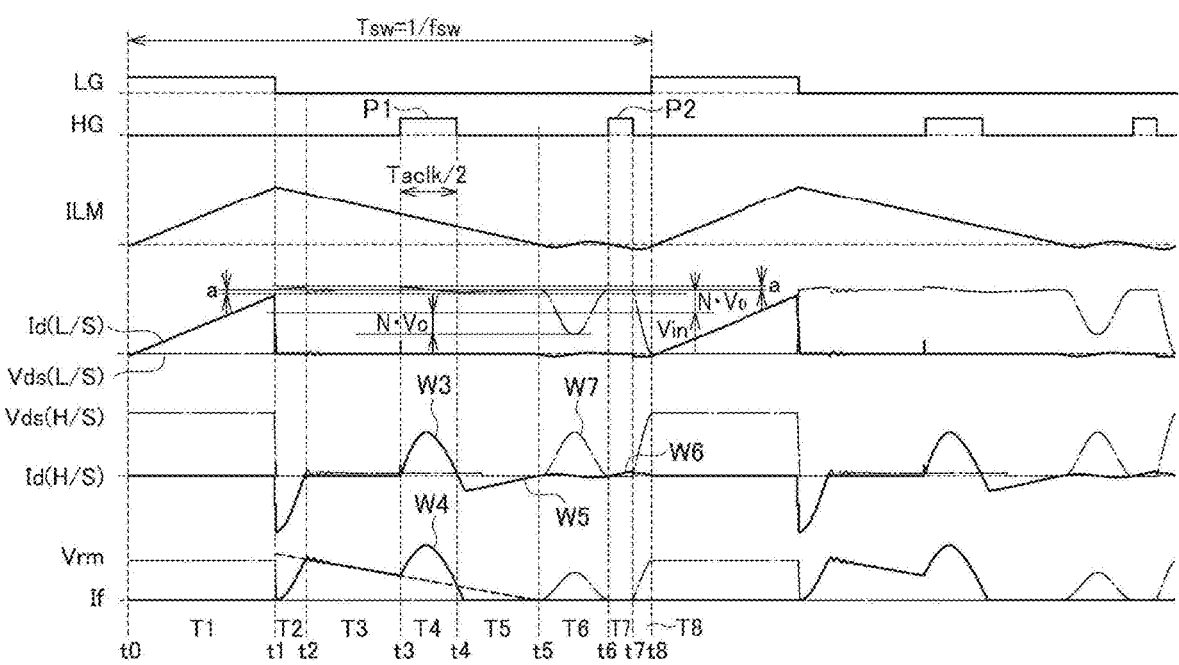

FIG. 17 is a diagram illustrating an operating waveform of an active clamp flyback converter according to a second embodiment.

Figure 18:
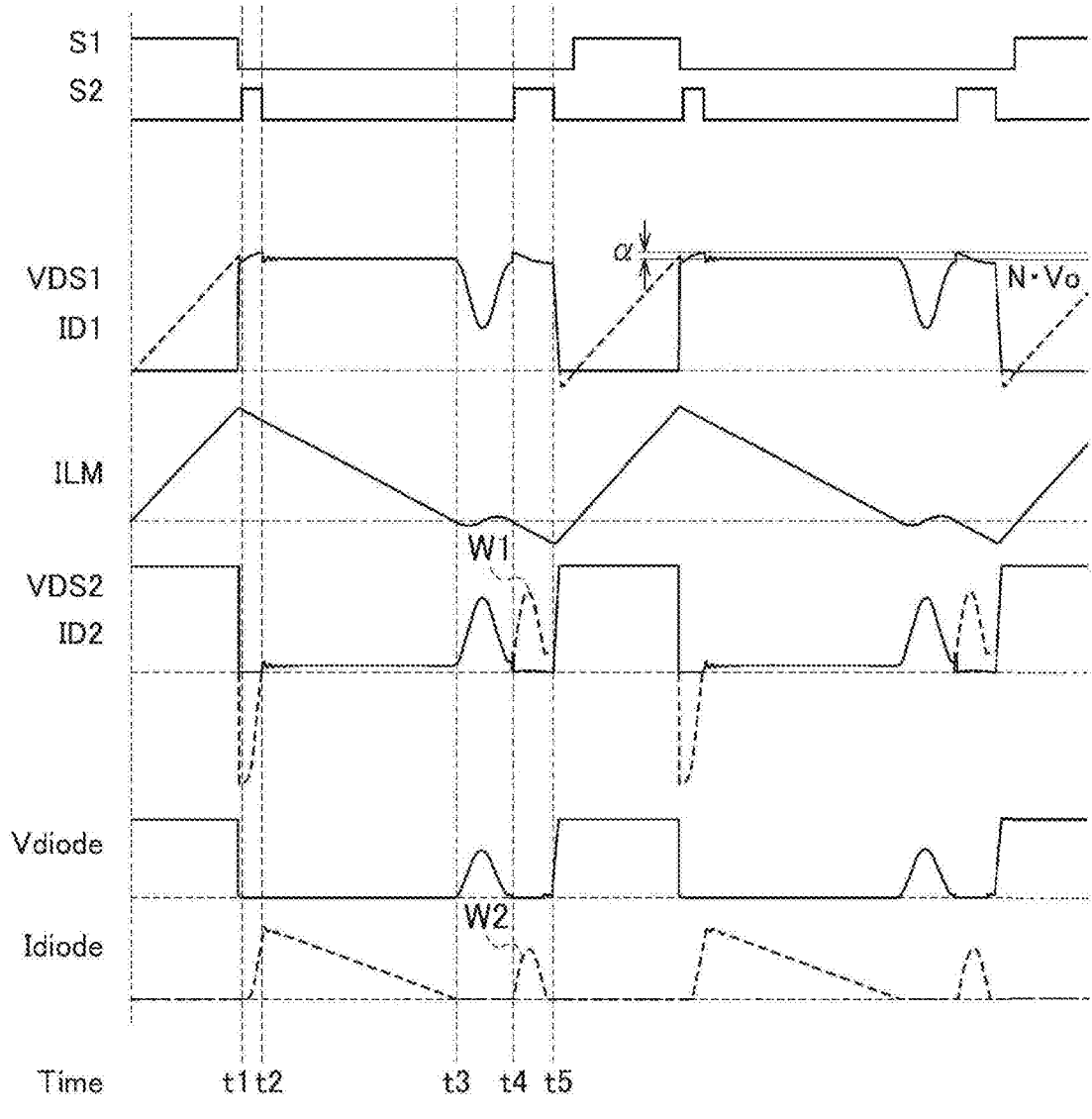

FIG. 18 is a diagram illustrating the operation waveform of an active clamp flyback converter according to the related technology.

Figure 19:
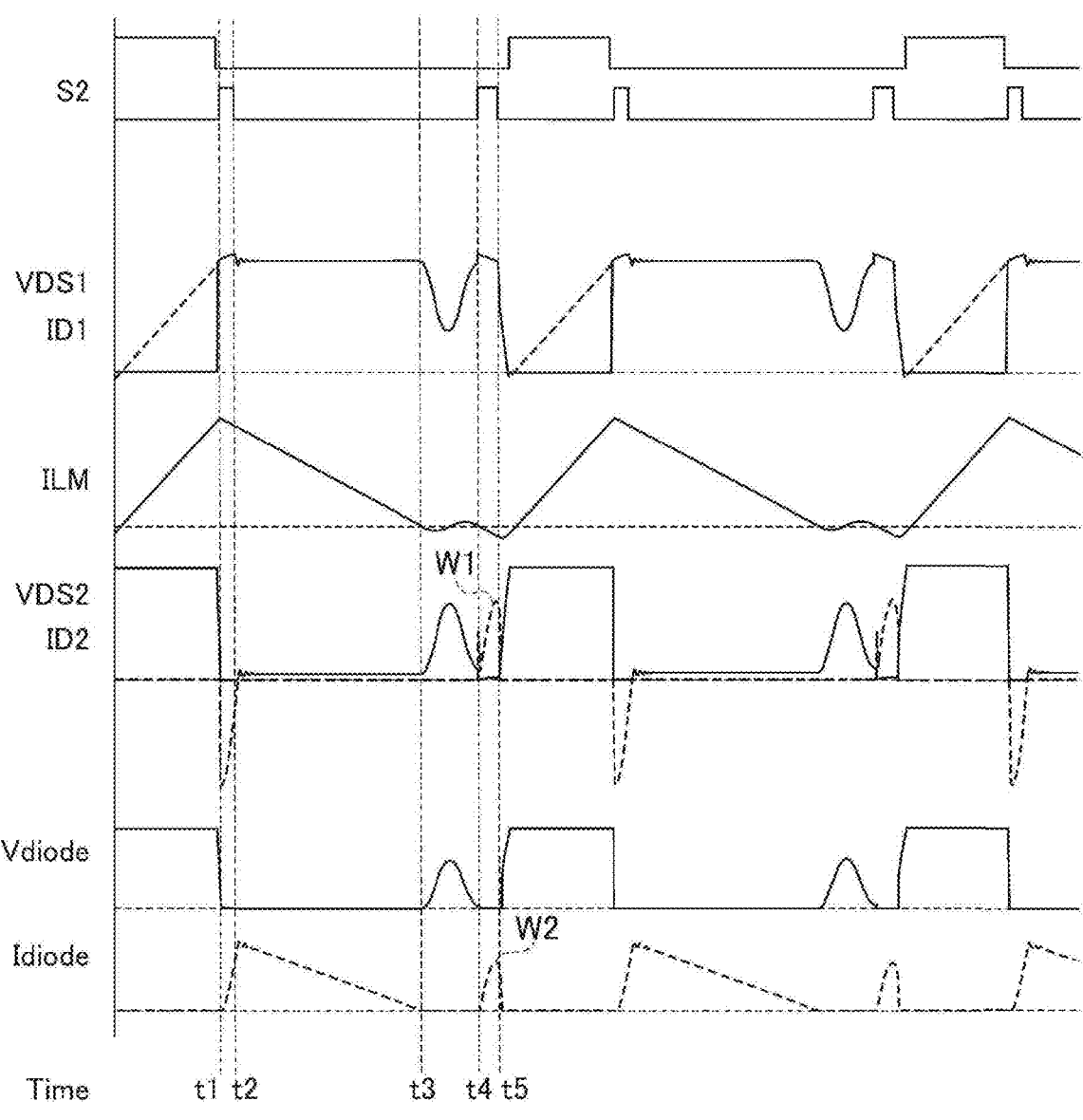

FIG. 19 is a diagram illustrating an operation waveform at a timing different from FIG. 18 in an operation waveform of an active clamp flyback converter according to the related technology.

Figure 20:
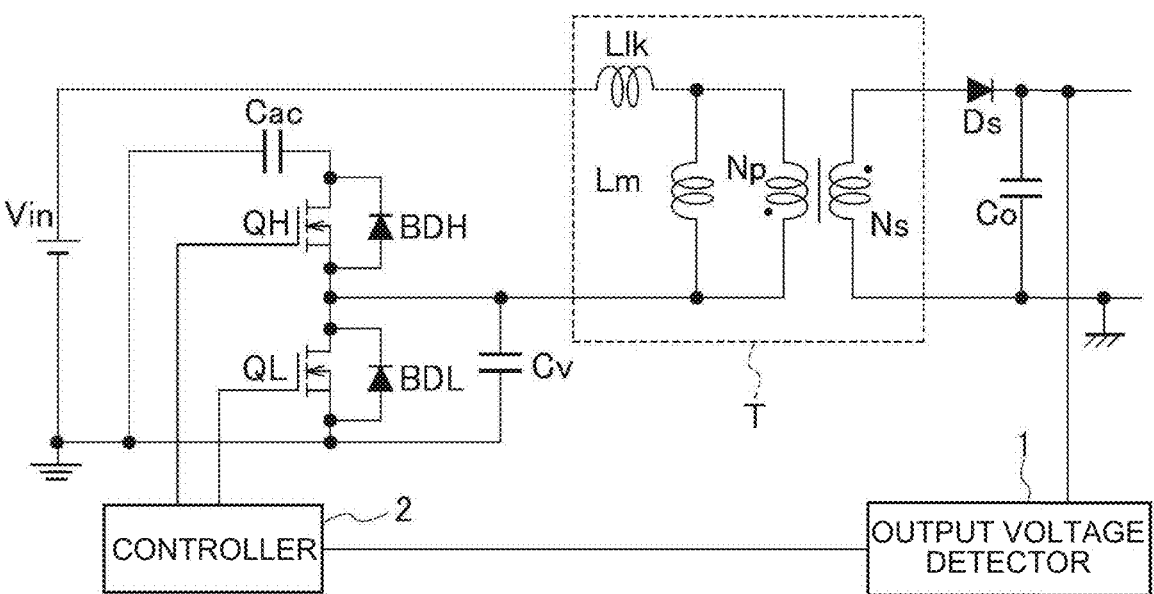

FIG. 20 is a diagram illustrating a configuration modification of an active clamp flyback converter according to one or more embodiments.

DETAILED DESCRIPTION

Hereinafter, the active clamp flyback converter according to one or more embodiments is described in detail with reference to the drawings. The same or equivalent portion in the diagram of the active clamp flyback converter according to each embodiment may be denoted by the same reference numerals and the description thereof may be omitted.

First Embodiment

Figure 1:
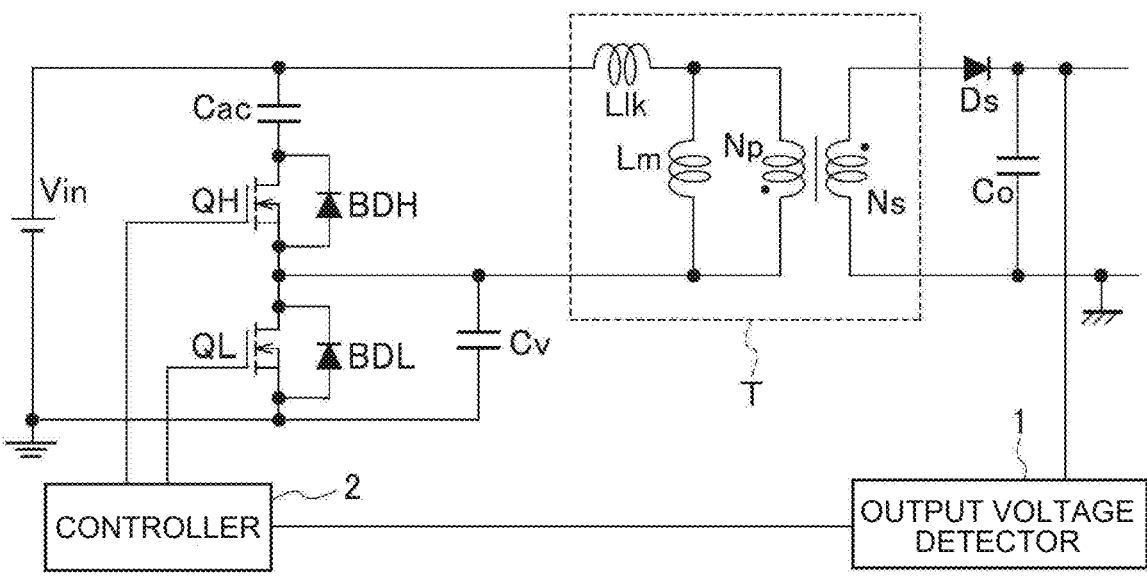
FIG. 1 is diagram illustrating a configuration of an active clamp flyback converter according to the first embodiment.

FIG. 1 is a configuration diagram of an active clamp flyback converter according to the first embodiment. The active clamp flyback converter according to the first embodiment includes a first series circuit in which the main switch QL and the primary winding Np of the transformer T are connected in series at both ends of the DC power supply Vin. Further, the active clamp flyback converter according to the first embodiment includes a second series circuit in which a clamp switch QH and a clamp capacitor Cac are connected in series at both ends of the primary winding Np.

The main switch QL and the clamp switch QH include a MOSFET (Metal Oxide Semiconductor Field Effect Transistor). The main switch QL and the clamp switch QH include body diodes BDL and BDH between the drain and the source, respectively. In addition, the MOSFET has an output capacitance Coss between the drain and the source, and the capacitance appears in the resonant operation. In order to simplify the operation explanation, in FIG. 1, a voltage resonant capacitor (CV) is connected to both ends of the main switch QL, but it is not necessary to place a capacitor in addition to the output capacitance Coss of the MOSFET.

Further, the active clamp flyback converter according to the first embodiment includes a transformer T having a secondary winding Ns electromagnetically coupled to the primary winding Np. The transformer T includes an excitation inductance Lm in the primary winding Np. The coupling coefficient of the primary winding Np and the secondary winding Ns may be set to less than 1 so that the primary winding Np has a leakage inductance Llk. At both ends of the secondary winding Ns, a third series circuit in which the rectifier Ds and the output capacitor Co are connected in series is connected.

The active clamp flyback converter according to the first embodiment includes an output voltage detector 1 that detects the output voltage of the output capacitor Co, and the controller 2 which turns on and off a main switch QL based on an output voltage detected by an output voltage detector 1 and turns on and off a clamp switch QH twice by a first pulse and a second pulse during an off period of the main switch QL. Controlling the switch may include at least one of turning the switch on and switching off. The order in which the switches are turned on or off may be operated first. The switch may first turn on and then turn off. Also, the switch may be turned off first and then turned on.

The controller 2 controls a first on-signal that turns on and off the main switch QL, and a second on-signal (the first pulse) that turns on and off the clamp switch QH during the period when the main switch QL is off at the first on-signal, the third on-signal (the second pulse) that turns the clamp switch QH on and off again after the second on-signal.

The controller 2 sets the on-timing of the second on-signal so that the resonant current is limited by the excitation current of the excitation inductance of the primary winding. The resonant current may be a current flowing in the direction of charging the clamp capacitor Cac after the lapse of a half (½) cycle time of the resonance period of the resonance circuit of the lamp capacitor Cac and the leakage inductance Llk generated when the clamp switch QH is turned on by the second on-signal. The controller 2 sets the on-period of the second on-signal to ½ or more of the resonant period so that the clamp capacitor Cac is charged only once by the resonant current that discharges the clamp capacitor Cac when the clamp switch QH is turned on, and the current limited by the inverted resonant current and the excitation current charges the clamp capacitor Cac. The controller 2 controls the clamp switch QH to be turned on and off at the second on-signal, and the third on-signal is output after the excitation current of the excitation inductance Lm is zero. The controller 2 controls the clamp switch QH to be turned on at the third on-signal and a negative current flow through the excitation inductance.

After the main switch QL is turned off and the energy stored in the leakage inductance Llk is transferred to the clamp capacitor Cac, the time when the excitation current of the transformer T decreases and becomes zero is Toff1. Further, the resonance period between the clamp capacitor and the leakage inductance Llk is Taclk.

In one or more embodiments, for the on-timing of the first pulse of the clamp switch QH, when the current of the excitation inductance becomes sufficiently small with respect to the resonant current, that is, on-period is set before the current of the excitation inductance becomes zero.

When the on-period of the clamp switch QH is set to Taclk/2 and the end time of the on-period is set to the time when the excitation current of the excitation inductance Lm becomes zero, the excitation current in the negative direction does not flow, and the resonant current flows only in the positive direction. Therefore, the voltage of the clamp capacitor Cac is discharged to the voltage of N·Vo−α. Therefore, when the clamp switch QH is turned on for the second time, a voltage equal to or less than the output voltage Vo is applied to the secondary winding Ns, so that the resonant current between the clamp capacitor Cac and the leakage inductance Llk is not generated.

Further, if the voltage of the clamp switch QH is less than N·Vo when it is turned on for the second time, the resonant current does not flow when it is turned on for the second time. Therefore, if the positive charge amount of the resonant current flowing at the first ON is Qp, and the negative charge amount Qn limited by the excitation inductance Lm is Qp/2≥Qn, the resonant current does not flow at the second on.

Further, if the resonance period between the clamp capacitor Cac and the leakage inductance Llk is Taclk, the first on-period is greater than or equal to the period during which the positive current is flowing, and the off-timing may be while the negative current is flowing. For this reason, the period during which the negative current is flowing is Taclk/2 when it is not limited by the excitation inductance Lm, and when the negative current is limited, it is a period of Taclk/2 or more. Therefore, at least the first on-period of the clamp switch QH is preferably set at Taclk/2 to Taclk, but the first pulse may be turned off before the end of the negative current.

In one or more embodiments, the controller 2 sets the on-time of the second on-signal from Toff1−Taclk to Toff1−Taclk/2, the on-period is Taclk/2 or more, and the off-time is set to the time until the excitation current becomes zero.

When the main switch QL is turned on, the energy stored in the leakage inductance Llk and transferred to the clamp capacitor Cac after the main switch QL is turned off, is turned on by the clamp switch QH at the second on-signal and regenerative output to the secondary side.

Further, the controller 2 turns on the clamp switch QH after the excitation current decreases and becomes zero by the third on-signal and flows the excitation current of the excitation inductance Lm in the negative direction.

When the clamp switch QH is turned off by the third on-signal, the energy of the voltage resonant capacitor Cv is regenerated to Vin by the excitation current in the negative direction of the excitation inductance Lm, thereby reducing the turn-on loss of the main switch QL.

FIG. 20 is a modification of the configuration diagram of an active clamp flyback converter according to the first embodiment shown in FIG. 1. In the control of the clamp switch according to one or more embodiments, it may be easily determined that the second series circuit of the clamp switch QH and the clamp capacitor Cac has the same effect even if they are connected as shown in FIG. 20, the explanation will be made with reference to the structural diagram of FIG. 1 in this description. However, the scope of one or more embodiments also applies to active clamp flyback converters that have been modified as shown in FIG. 20.

FIG. 2 is a diagram illustrating the first operating waveform of the active clamp flyback converter according to the first embodiment. In FIG. 2, LG is the gate signal of the main switch QL. The HG is the gate signal of the clamp switch QH. The ILM is the excitation current flowing through the excitation inductance Lm. The Vds(L/S) is the voltage between the drain and the source of the main switch QL. The Ids(L/S) is the drain current of the main switch QL. The Vds(H/S) is the voltage between the drain and the source of the clamp switch QH. The Ids(H/S) is the drain current of the clamp switch QH. The Vrm is the voltage across the diode Ds. If is the current of the diode Ds. The resonance period between the clamp capacitor Cac and the leakage inductance Llk is Taclk.

As shown in FIG. 2, the first pulse P1 is turned on before Taclk/2 from the time t5 when the excitation current ILM of the transformer T becomes zero and after the time before Taclk from the time t5. The on-period is set between Taclk/2 and Taclk so that the first pulse P1 is off before the time t5 when the excitation current ILM of the transformer T becomes zero. Therefore, the first pulse P1 is turned off between time t5 and time t5 before Taclk/2. The second turn-on of the second pulse P2 is when the excitation current is reduced to zero, and then the drain-source voltage Vds (H/S) of the clamp switch QH oscillates due to the resonant operation by the excitation inductance Lm and the voltage resonant capacitor Cv, and a bottom switch (top of the drain-source voltage Vds (L/S) of the main switch QL) of the drain-source voltage Vds (H/S) of the clamp switch QH, and is when the resonant current flowing through the excitation current ILM is decreasing and becomes zero.

Next, with reference to FIGS. 4 to 11, the operation of the period T1 to T8 of the first operating waveform shown in FIG. 2 is described. First, the operation of the period T1 is described with reference to FIG. 4. In the period T1, at time t0, the main switch QL is turned on, so that current flows in the path of the Vin positive electrode→LlK→Lm→QL→Vin negative electrode. At this time, the excitation current ILM flows through the excitation inductance Lm of the transformer T, the excitation current ILM increases linearly, and energy is stored in the excitation inductance Lm. Since the same current flows through the leakage inductance Llk as the excitation current flowing in the excitation inductance Lm, energy is also stored in the leakage inductance L12lk. At time t1, the main switch QL is turned off.

Next, the operation of the period T2 is described with reference to FIG. 5. In the period T2, at time t1, the main switch QL is turned off, and the energy stored in the leakage inductance Llk of the transformer T cannot flow to the secondary side. For this reason, the energy stored in the leakage inductance Llk flows current in the path of Llk→Lm→BDH→Cac→Llk. That is, through the body diode BDH of the clamp switch QH, the clamp capacitor Cac is charged. At this time, since the voltage of the clamp capacitor Cac is N·Vo or less, the energy stored in the excitation inductance Lm of the transformer T charges the clamp capacitor Cac.

Next, when the voltage of the clamp capacitor Cac becomes N·Vo or higher, the energy stored in the excitation inductance Lm of the transformer T begins to flow as Lm→Np. Therefore, a current begins to flow from the secondary winding of the transformer T in the path of Ns→Ds→Co→Ns. At time t2, the energy stored in the leakage inductance Llk terminates the discharge. At this time, the voltage of the clamp capacitor Cac is higher than N·Vo by the energy stored in the leakage inductance Llk and becomes N·Vo+α. N is the turns ratio of Np/Ns.

Next, the operation of the period T3 is described with reference to FIG. 6. The operation of the period T3 is the same as that of a normal flyback converter, and the energy stored in the excitation inductance Lm flows Lm→Np→Lm. On the secondary side, Ns→Ds→Co→Ns flows, and a current W2 flows through the diode current If. In the period T3, at time t2, the energy stored in the leakage inductance Llk is all charged to the clamp capacitor Cac, and in the period T3, the voltage of the clamp capacitor Cac remains N·Vo+α. Further, since the voltage between the primary windings Np is N·Vo when the forward voltage of the diode Ds is ignored, the voltage of the main switch QL is Vin+N·Vo.

Next, the operation of the period T4 is described with reference to FIG. 7.

Since the time t3 is set before the excitation current ILM reaches zero, the excitation current ILM is discharging current to the secondary side. Therefore, the back electromotive force of the primary winding Np is N·Vo. At time t3, the clamp switch QH is turned on by the first pulse P1 for the first time. The voltage of the clamp capacitor Cac is N·Vo+α, and the potential difference of a is applied to Llk.

For this reason, in the period T4, the clamp capacitor Cac and the leakage inductance Llk are resonant in operation, and the resonant current W3 flows in the path of Cac→QH→Np→Llk→Cac. In addition, the excitation current of 1LM of the excitation inductance Lm flows from Lm→Np→Lm. Therefore, since the excitation current ILM of an excitation inductance Lm and a resonant current flow in the same direction in Np, the current W4 obtained by superimposing the resonant current on the excitation current of the excitation inductance Lm flows Ns→Ds→Co→Ns on the secondary winding Ns side. At time t4, the resonant current W3 becomes zero at ½ of the resonance period Taclk. At this time, since the clamp capacitor Cac is in resonant operation, it becomes N·Vo−α.

Next, the operation of the period T5 is described with reference to FIG. 8.

In the period T5, at time t4, the resonant current goes from 0 to negative, and the resonant current flow LlK→Np→QH-→Cac→Llk, in the opposite direction from the period T4. The current of the excitation inductance Lm flows in the same direction as the period T4 at Lm→Np→Lm. Since the resonant current and the excitation current ILM flow in opposite directions, when the excitation current is greater than the resonant current, a current corresponding to the difference between the excitation current and the resonant current flows on the secondary side. When the resonant current equals the excitation current, a current limited the excitation current ILM flows LlK→Lm→QH→Cac→Llk on the primary side, as in the waveform W5. Therefore, no current flows on the secondary side.

In this period T5, since it is a period in which current flows to the drain direction from the source of the clamp switch QH, if the clamp switch QH is turned off during this period, it is commutated to the body diode BDH. Thus, the mode of operation does not change.

Since the current value flowing in the leakage inductance Llk and the crest value of the resonant current when the main switch QL is turned on are equal, if the first pulse P1 is set as described above, the charge amount of the waveform W5 is ½ or less of the charge amount of W3. Therefore, the voltage of the clamp capacitor Cac is less than or equal to N·Vo, and the voltage of the difference from the N·Vo voltage is expressed as α'.

Next, the operation of the period T6 is described with reference to FIG. 9.

In the period T6, at time t5, the voltage of the clamp capacitor Cac is less than or equal to N·Vo (N·Vo−α'), and all the energy stored in the transformer is discharged.

The diode Ds becomes non-conductive due to the discharge of the resonant operation of the period T4, and both the clamp switch QH and the main switch QL are turned off.

Since the voltage of the voltage resonant capacitor Cv is Vin+N·Vo−α', Lm+Llk between the voltage resonant capacitor Cv and the DC power supply Vin has a potential difference of N·Vo−α'. For this reason, the inductance Lm+Llk of the voltage resonant capacitor Cv and the transformer primary winding are in series resonant operation, and current flow in the path of Cv→Lm→Llk→Vin→Cv, and the voltage of the voltage resonant capacitor Cv is dropped. If the resonance period between the voltage resonant capacitor Cv and the inductance Lm+Llk of the transformer primary winding is Tcvlm, the voltage of the voltage resonant capacitor Cv drops to Vin−N·Vo+α' at the time t5 to Tcvlm/2 elapsed, and then the current flows in the opposite direction from the path, and the voltage resonant capacitor Cv become Vin+N·Vo−α' again at the time when Tcvlm has elapsed from time t5.

Further, since the phase of the resonant current is π/2 advance phase with respect to the resonant voltage, the time when the voltage of the voltage resonant capacitor Cv becomes Vin+N·Vo−α' again is the same as the time when the resonant current flowing through the excitation inductance becomes zero during the decrease.

This resonant operation continues the same resonant operation if the main switch QL and clamp switch QH remain off, and the voltage of the voltage resonant capacitor is repeatedly N·Vo after the elapsed n·Tcvlm from time t5 (n is a natural number). (In reality, since there is a parasitic resistance in this series resonance, it becomes LCR series resonance, and the amplitude of the resonant voltage and resonant current decays, but after the elapsed from time t5 to n·Tcvlm (n is a natural number), the voltage of the voltage resonant capacitor is closest to N·Vo.)

Next, the operation of the period T7 is described with reference to FIG. 10.

In the period T7, the time t6 the voltage of the voltage resonant capacitor Cv returns to Vin+N·Vo−α' again, that is the time when the excitation current ILM of the excitation inductance Lm become zero during decreasing, and the clamp switch QH is turned on by the second pulse P2 turns on.

Thereby, the potential difference of the clamp switch QH turns at the minimum value. That is, due to the bottom switching, switching loss is small.

Since the voltage of the clamp capacitor Cac is less than or equal to N·Vo, no voltage above Vo is generated in the secondary winding NS, and the diode Ds is non-conductive, so that the resonant current due to the clamp capacitor Cac and the leakage inductance Llk does not flow on either the primary or secondary side.

Thus, in the period T7, a current flows with Cac→QH→Lm→Llk→Cac, a current in the negative direction flows through the excitation inductance Lm, and the clamp switch QH turns off at time t8.

Here, the time t6, that is, the time at which the clamp switch is turned on at the second pulse, is the time when the voltage of the voltage resonant capacitor Cv returns to Vin+N·Vo−α' again, that is, it may be the time when excitation current ILM of the excitation inductance Lm becomes zero during the decrease, and in the above description, the period T6 has been described as Tcvlm, but the period T6 may be n·Tcvlm (n is a natural number) and the same effect may be obtained.

Next, the operation of the period TB is described with reference to FIG. 11. In the period T8, when the clamp switch QH is turned off at time t7, the energy stored in the excitation inductance Lm flows Lm→Llk→Vin→Cv→Lm, and the charge of the voltage resonant capacitor Cv is discharged, and the applied voltage of the main switch QL at time t8 becomes zero volts.

FIG. 3 is a diagram illustrating the second operating waveform of the active clamp flyback converter according to the first embodiment.

This differs from the first operation waveform shown in FIG. 2 in that there is no period T6, and the corresponding period is the same operation as the description of the first operation waveform shown in FIG. 2, a detailed explanation of each period is omitted.

As shown in FIG. 3, in the period T1, the main switch QL turns on at time t0 and turns off at time t1. In the period T2, the current accumulated in the leakage inductance Llk flows from the body diode BDH of the clamp switch QH to the clamp capacitor Cac. As a result, a current W1 flows through the clamp switch QH.

With this current, the voltage of the clamp capacitor Cac becomes a voltage of N·Vo+α, and the voltage Vds (L/S) of the main switch QL becomes a voltage of Vin+N·Vo+α.

In the period T3, the voltage of the main switch QL is Vin+N·Vo, the excitation current flows from the secondary winding Ns to the output, so the primary winding becomes N·Vo, and since the clamp switch QH is off, the energy stored in the excitation inductance Lm of the transformer T is output from the secondary winding Ns to the secondary side in the same manner as in a normal flyback converter.

The turn-on of the first pulse P1 of the clamp switch QH is at time t3. The time t3 is the period during which the energy stored in the excitation inductance Lm of the transformer T in a normal flyback converter is output from the secondary winding Ns to the secondary side, and is a time before Taclk/2 to Taclk from the time t5, which is the time when the excitation current ILM of the transformer T becomes zero.

In the period T4, the primary winding of the transformer is the voltage of N·Vo, and the voltage of the clamp capacitor Cac is N·Vo+α, so when the clamp switch QH is turned on at time t3, a voltage of +α is applied to the leakage inductance Llk, the leakage inductance Llk and the clamp capacitor Cac become resonant operation, and the resonant current W3 flows to the clamp switch QH.

After the elapse of Taclk/2 from time t3, the resonant current W3 becomes zero, and the voltage of the clamp capacitor Cv was N·Vo+α at time t3, but it becomes a voltage of N·Vo−α″ at time t4. Since the resonant current W3 flowing through the period T3 flows in the same direction as the direction in which the current stored in the excitation inductance Lm is discharged to the secondary side, the resonant current W4 superimposed on the excitation current flows on the secondary side.

In the period T5, the time t4 is the time when ½ of the resonant period of the resonant current W3 has elapsed from the time t3, and at the time t4, the resonant current W3 becomes zero, and the resonant current from time t4 flows in the drain direction (negative direction) from the source of the clamp switch.

However, since this resonant current flows in the opposite direction to the direction of discharging the current stored in the excitation inductance Lm to the secondary side, it becomes a current waveform of W5 limited by the excitation current.

The clamp switch QH turns off while a resonant current limited by this reverse-flowing excitation current is flowing. When the clamp switch QH is turned off, the resonant current limited by the excitation current flows to the body diode BDH. The amount of charge Qp of the resonant current flowing in the period T4 discharges the voltage α, which is the voltage difference between the clamp capacitor Cac and the back electromotive voltage generated in the primary winding, to voltage −α′, so that the amount of charge Qn of the current flowing in the period T5 is Qp/2 or less, and the voltage of the clamp capacitor at the current W5 of the period T5 may not be more than N·Vo.

In the period T7, time t5 is the time when the excitation current ILM decreases to zero, and at time t5, the clamp switch QH is turned on, and a negative current W6 flows through the excitation inductance Lm. Since the voltage of the clamp capacitor is less than or equal to N·Vo at time t5, the resonant current does not flow even if the clamp switch QH is turned on. Therefore, no resonant current flows on the secondary side.

In the period T8, when the clamp switch QH is turned off at time t7, the current W6 in the negative direction of the excitation inductance discharges the voltage resonant capacitor Cv, and at time t8 the voltage of the main switch QL reaches zero volts.

Since the main switch QL is turned on at the time when the voltage of the main switch QL becomes zero at time t8, the main switch QL is zero-volt switching, and a high-efficiency, low-noise power supply may be configured.

Further, since the current of the diode Ds on the secondary side becomes a continuous current such as W2+W4, and no current flows during the periods T7 and T8, synchronous rectification may be easily realized, and a further high-efficiency power supply may be configured.

In the second operating waveform of the active clamp flyback converter according to the first embodiment shown in FIG. 3, the off-timing of the first pulse P1 of the clamp switch QH in the first time may be turned off at time t5 because it may be within the period T5. Further, the second pulse P2 of the clamp switch QH in the second time is the terminal time t5 of the period T5. Therefore, in the operation mode shown in FIG. 3, the first pulse P1 and the second pulse P2 may be connected and driven.

Example of the First Embodiment

FIG. 12 is a diagram illustrating a specific example of an active clamp flyback converter AFC according to the first embodiment. FIG. 13 is a diagram showing the first operation waveform of the AFC shown in FIG. 12. Here, the configuration of FIG. 12 is described in combination with FIG. 13.

In FIG. 12, for the configuration shown in FIG. 1, an auxiliary winding Na is provided in the transformer T, and the controller 2a is different.

The auxiliary winding Na is electromagnetically coupled to the primary winding Np and the secondary winding Ns. One end of the resistor Ra1 and the anode of the diode Da are connected to one end of the auxiliary winding Na, the cathode of the diode Da and one end of the capacitor Ca are connected, and one end of the resistor Ra2 and the other end of the capacitor Ca are connected to the other end of the auxiliary winding Na, and the other end of the capacitor Ca is grounded.

The other end of the resistor Ra1 and the other end of the resistor Ra2 detect a voltage Vna obtained by resistively dividing the voltage of the auxiliary winding Na, and the detected voltage Vina is output to the excitation current detector 30, the threshold generator 31, and the bottom detector 25 of the controller 2a.

The controller 2a includes the FB controller 20, the first on-signal unit 21, the first drive circuit 22, the bottom detector 25, the excitation current detector 30, the threshold generator 31, the on-timing detector 32, the second on-signal unit 33, the third on-signal unit 34, and the second drive circuit 35.

The FB controller 20 generates a feed control signal based on the output voltage detected by the output voltage detector 1 and a predetermined value, and outputs the feed control signal to the first on-signal unit 21. The first on-signal unit 21 generates a first on-signal for turning on the main switch QL based on the feed control signal. The first drive circuit 22 turns on the main switch QL by the first on-signal from the first on-signal unit 21.

The excitation current detector 30 detects an excitation voltage VLm proportional to the excitation current based on the voltage Vna. The threshold generator 31 generates a threshold value Vth proportional to the output voltage Vo based on the voltage Vna. The on-timing detector 32 detects the on-timing for turning on the first pulse of the second drive circuit 35.

The excitation current zero detector 26 detects the time when the excitation voltage VLm detected by the excitation current detector 30 becomes zero with a negative slope.

The bottom detector 25 detects when the voltage of the clamp switch QH becomes the bottom (the top of the voltage of the main switch QL) based on the voltage Vna.

The second on-signal unit 33 generates a second on-signal P1 at the timing detected by the on-timing detector 32. The third on-signal unit 34 generates a third on-signal P2 at the timing detected by the bottom detector 25.

The second drive circuit 35 turns on the clamp switch QH at the on timing of turning on the first pulse by the second on-signal P1 from the second on-signal unit 33.

Further, the second drive circuit 35 turns on the clamp switch QH at the on-timing of turning on the second pulse by the third on-signal P2 from the third on-signal unit 34.

Next, FIG. 13 shows the first operating waveform. With reference to FIG. 13 and the first operating waveform of the active clamp flyback converter according to the first embodiment of FIG. 2, the operation of the active clamp flyback converter shown in FIG. 12 is described. In FIG. 13, the Vna is a voltage obtained by dividing the voltage of the auxiliary winding Na by the resistors Ra1 and Ra2. The VLm is a voltage proportional to the excitation current detected by the excitation current detector 30. The Vth is a voltage proportional to the output voltage detected by the threshold generator 31.

Since the other numerals are the same as the numerals shown in FIGS. 2 and 3, their description is omitted.

In FIG. 13, when the main switch QL is turned on, a voltage of Vin is applied to the primary winding Np, and when the main switch QL is turned off, a voltage of –N·Vo is generated on the primary winding Np.

The excitation current detector 30 detects an excitation current of excitation inductance Lm of the primary winding Np based on the following operation. When both end voltage V of the inductance and inductance value L are assumed, the current I flowing through the inductance increases with I=V/LX t (t is time). Since the voltage Vna is a voltage proportional to the voltage across the auxiliary winding Na, and the auxiliary winding Na is electromagnetically coupled with the primary winding Np and the secondary winding Ns, the voltage across the auxiliary winding Na is proportional to the voltage across the primary winding Np, and is proportional to the voltage across the excitation inductance Lm, so the voltage Vna is detected by the integrator with the excitation voltage VLm proportional to the excitation current ILm.

The threshold generator 31 generates a voltage Vth proportional to the output voltage based on the positive voltage of the auxiliary winding Na. That is, the auxiliary winding Na is electromagnetically coupled to the primary winding Np and the secondary winding Ns, and the winding direction of the auxiliary winding Na and the secondary winding Ns is the same, since the positive voltage of the auxiliary winding Na generates the positive voltage of the secondary winding Ns, that is, the voltage proportional to the output voltage, the voltage Vth proportional to the output voltage may be generated based on the positive voltage of the auxiliary winding voltage Vna.

The on-timing detector 32 detects the on-timing t11 when the slope of the excitation voltage VLm detected by the excitation current detector 30 is negative (when the first on-signal is off) and the excitation voltage VLm becomes the threshold value Vth generated by the threshold generator 31.

The second on-signal unit 33 generates a first pulse P1 preset by the timing t11 detected by the on-timing detector 32.

The bottom detector 25 sets the resonance period of the voltage resonant capacitor Cv and the excitation inductance Lm of the transformer as Tcvlm, and after the first pulse P1 generated by the second on-signal unit 33, a zero voltage at which the voltage Vna changes from negative to positive is detected, and an on-timing t13 delayed by Tcvlm/4 from the time at which the zero voltage is detected is detected.

The third on-signal unit 34 generates a second pulse P2 preset at the timing t13 detected by the bottom detector 25.

The second drive circuit 35 generates a drive signal HG from the first pulse P1 of the second on-signal unit 33 and the second pulse P2 of the third on-signal unit 34, and the clamp switch QH is turned on by the first pulse P1 for the first time and the second pulse P2 for the second time.

The threshold generator 31 adjusts Vth so that the on-timing t11 detected by the on-timing detector 32 is detected before Taclk/2 to Taclk from the time tz when the excitation voltage Vm becomes zero, and generates a voltage proportional to the output voltage based on the positive voltage of the voltage Vna.

A setting example is described in FIG. 15.

The VLm (20) shown in FIG. 15 is the detection voltage of the excitation current detector 30 when the output voltage is 20V. VLm (10) is the detection voltage of the excitation current detector 30 when the output voltage is 10V. Since the excitation current is in the relationship between N·Vo/Lm·t, when the output voltage is ½, its slope is also ½.

The Vth (20) is adjusted so as to be detected before the time tz at which the exciting voltage VLm (20) becomes zero when the output voltage is 20V and between Tacklk/2 and Taclk, and for example as shown in FIG. 15, Vth is adjusted so as to detect 0.6Taclk before. Then, in the second on-signal unit 33, the on-width is set in the range of Tacklk/2 to Tacklk and the of-timing is set to the excitation current becomes zero. For example, in FIG. 15, when 0.6Taclk is set, the off-timing is 0.2Taclk before the excitation current ILM becomes zero.

Since the threshold generator 31 adjusts Vth in proportion to the output voltage based on the positive voltage of the voltage Vna, when the output voltage becomes 10V as shown in the dashed line VLm (10) in FIG. 15, the slope of the excitation voltage Vlm detected by the excitation current detector 30 becomes ½, but the threshold voltage generated by the threshold generator 31 is Vth (10) indicated by the dashed line. The on-timing t11 detected by the on-timing detector 32 is t11', which is 0.8Taclk before the excitation current becomes zero, and the off-timing t12 is t12', and the off-timing is 0.2Taclk before the excitation current ILM becomes zero.

Further, the negative slope of the excitation current does not change even if the input voltage Vin changes. Therefore, if the threshold value Vth is adjusted as described above when the output voltage Vo is a certain voltage, for example, 20V, even if the input voltage Vin or the output voltage Vo changes, the same effect as the effect of the active clamp flyback converter according to the first embodiment may be obtained.

Next, FIG. 14 shows a second operating waveform. With reference to FIG. 14 and the second operating waveform of the active clamp flyback converter according to the first embodiment of FIG. 3, the operation of the active clamp flyback converter shown in FIG. 12 is described The second operation waveform shown in FIG. 3 differs in that there is no period T6 of the first operating waveform shown in FIG. 2. In the first operating waveform, there is a period T6, so that the bottom of the clamp switch QH is detected by the bottom detector 25 and the on-timing t13 is detected. However, in the second operating waveform, there is no period T6. Therefore, the third on-signal unit 34 generates a pulse P2 at a timing when the excitation current detected by the excitation current zero detector 26 becomes zero.

Since the other corresponding period is the same operation as the description of the first operation waveform shown in FIG. 2, detailed description is omitted, but the effect of the active clamp flyback converter according to the first embodiment may be obtained. In the second operating waveform shown in FIG. 14, the first pulse P1 in the first time of HG driving the clamp switch QH and the second pulse P2 of HG in the second time may be connected.

Second Embodiment

FIG. 16 is a configuration diagram of an active clamp flyback converter according to a second embodiment.

The active clamp flyback converter shown in FIG. 16 includes a current detector 3 and a controller 2b.

During the off period of the main switch QL, the controller 2b sets the on-timing of the first pulse P1 of the clamp switch QH in the first time to a timing in which the amount of charge until the excitation current charging the clamp capacitor Cac is reduced to zero than one half of the charge amount of the resonant current that discharges the clamp capacitor Cac due to the first pulse on.

Thereby, it may be possible to prevent the resonant current from flowing during the second pulse-on.

The controller 2b includes an FB controller 20, a first on-signal unit 21, a first drive circuit 22, an excitation current detector 30, an excitation current zero detector 26, a bottom detector 25, a second on-signal unit 33, a third on-signal unit 34, a second drive circuit 35, an integrating circuit 37, and a delay circuit 38.

The FB controller 20, the first on-signal unit 21, the first drive circuit 22, the excitation current detector 30, the excitation current zero detector 26, the bottom detector 25, the second on-signal unit 33, and the third on-signal unit 34 have been described in FIG. 12, therefore, the explanation is omitted.

The second on-signal is ½ or more of the resonance period between the clamp capacitor Cac and the leakage inductance Llk, and has an on-width equal to or less than the resonance period. Since the third on-signal is turned on in the same manner as in the first embodiment, its description is omitted.

In the current detector 3, one end of the capacitor Cs is connected to the connection point of the clamp capacitor Cac and the clamp switch QH, and the other end of the capacitor Cs is grounded via a resistor Rs.

The current detector 3 detects a positive current and a negative current flowing through the clamp capacitor Cac by turning on the first pulse. The detection current is proportional to the capacitance ratio between the clamp capacitor Cac capacitance and the capacitor CS capacitance.

The integrating circuit 37 calculates the amount of discharge by integrating the current in the direction of discharging the clamp capacitor detected by the current detector 3, and calculates the amount of charge by integrating the current in the direction of charging the clamp capacitor.

Specifically, the integrating circuit 37 is KP:KN=1:2, where an integration factor KP in the direction of discharging the clamp capacitor Cac and an integration factor KN in the direction of charging the clamp capacitor Cac are used.

The delay circuit 38 delays the on-timing of the first pulse P1 in the first time with respect to the first on-signal from the first on-signal unit 21 so that the charge amount obtained in the integrating circuit 37 is ½ or less of the discharge amount.

The second on-signal unit 33 outputs a second on-signal in which the on-timing of the first pulse P1 is delayed with respect to the first on-signal in the delay circuit 38 to the first drive circuit 22.

FIG. 17 is a diagram showing the operating waveform of an active clamp flyback converter according to the second embodiment.

In FIG. 17, the on-period of the first pulse P1 in the first time is Taclk/2 or more. The turn-on timing of the first pulse P1 in the first time is that the excitation current is zero or more.

The on-timing of the first pulse P1 is delayed to the time t3 by the delay circuit 38 so that the charge amount of the waveform W5 in the negative direction flowing after the lapse of Tacklk/2 from the turn-on of the first pulse P1 becomes smaller than ½ of the discharge amount of the waveform W3 in the positive direction of the current Id (H/S) of the clamp switch QH flowing during the lapse of Taclk/2 from the turn-on of the first pulse P1.

By delaying the on-timing of the first pulse P1 in this way, the voltage of the clamp capacitor Cac at time t3 was N·Vo+α, but it is lowered to N·Vo−α' at time t4 and charged to N·Vo at time t5. For this reason, no resonant current flows to the secondary side in the second pulse P2 in the second time.

As described above, according to one or more embodiments, an active clamp flyback converter may be provided that facilitates synchronous rectification of the rectified current on the secondary side.

The active clamp flyback converter according to one or more embodiments may be applicable to switching devices.

As described above, in the active clamp flyback converter according to one or more embodiments, a first series circuit in which the main switch, the first diode, and the first parallel circuit of the voltage resonant capacitor and the primary winding are connected in series is connected to both ends of the DC power supply. At both ends of the primary winding, a second series circuit in which a clamp switch, a second parallel circuit of two diodes, and a clamp capacitor are connected in series are connected. A transformer (T) having a secondary winding electromagnetically coupled to the primary winding, the transformer (T) has an excitation inductance (Lm) in the primary winding (NP), and is configured such that the coupling coefficient of the primary winding and the secondary winding is less than 1 so that the primary winding (NP) has leakage inductance (Llk), and a third series circuit in which a rectifier (Ds) and an output capacitor (Co) are connected in series is connected to both ends of the secondary winding (Ns).

A converter according to one or more embodiments may include a controller (2) that turns on and off the main switch (QL) and turns the clamp switch (QH) on and off twice during the main switch is off. After the main switch (QL) is off and the energy accumulated in the leakage inductance (Llk) is transferred to the clamp capacitor, at the controller (2), the time when the excitation current of the transformer decreases and becomes zero is Toff1, and the resonance period between the clamp capacitor and the leakage inductance is Taclk, and the first on-period of the clamp switch is set to Taclk/2 to Taclk, and the on-time is set from Toff1−Taclk to Toff1−Taclk/2, and the off-time is set from Toff1−Taclk/2 to Toff1, and when the main switch is on, the leakage inductance (Llk) is accumulated, and the energy transferred to the clamp capacitor (Cac) causes the resonant current of the clamp capacitor (Cac) and the leakage inductance to flow in the first on-state, then the clamp capacitor (Cac) is discharged, and the energy of the clamp capacitor is regenerated and output to the secondary side, and when the resonance current flows in the reverse direction, the resonance current in the reverse direction is limited by the excitation current to limit charging to the clamp capacitor (Cac).

By reducing the electric charge of the charge to less than half of the electric charge of the discharge, the resonant current does not flow even if the clamp switch is turned on, and the resonant current cannot flow on the secondary side.

The controller (2) turns the clamp switch (QH) the second ON at a time when the excitation current is decreasing and becomes zero. Since the energy of the clamp capacitor is regenerated and output to the secondary side at the first on, the resonant current does not flow at the second on, and the excitation current of the excitation inductance flows in the negative direction, which reduces the turn-on loss of the main switch.

Although one or more embodiments are described above, the above-mentioned embodiments are examples to embody the technical concept, and individual configurations, combinations, etc. are not specific to those described above. A various change may be made to one or more embodiments described to the extent that the gist is not departed from.

The invention claimed is:

1. An active clamp flyback converter comprising:
a main switch electrically connected to one end of a DC power supply;
a primary winding electrically connected in series with the main switch;
a clamp switch electrically connected in series with the main switch;
a clamp capacitor electrically connected in series with the clamp switch;
a controller that controls the main switch and the clamp switch, wherein
the controller performs operations comprising:
controlling a first on-signal that controls the main switch, a second on-signal that controls the clamp switch during a period when the main switch is off, and a third on-signal that controls the clamp switch again after the second on-signal;
setting an on-timing in which a resonance current flowing in a direction of charging the clamp capacitor is reversed after a lapse of a half cycle time of a resonance cycle of a resonance circuit of the clamp capacitor and leakage inductance, which is generated when the clamp switch is turned on, is limited by an excitation current of an excitation inductance of the primary winding;
setting an on-period of the second on-signal to a half or more of a resonance period so that the resonant current discharging the clamp capacitor and the resonant current inverted and the current limited by the excitation current charge and discharge the clamp capacitor once when the clamp switch is turned on;
outputting the third on-signal after the excitation current of the excitation inductance is zero while controlling the clamp switch by the second on-signal; and
controlling a negative current flowing through the excitation inductance while turning on the clamp switch by the third on-signal.

2. The active clamp flyback converter according to claim 1, wherein
the controller further comprises a bottom detector that detects the minimum voltage of the clamp switch after the excitation current of the excitation inductance becomes zero, wherein
the controller performs operations comprising:
outputting the third on-signal at a time when the minimum voltage of the clamp switch detected by the bottom detector becomes the minimum;
turning on the clamp switch based on the third on-signal; and
flowing a negative current through the excitation inductance.

3. The active clamp flyback converter according to claim 1, wherein
the controller performs operations further comprising:
setting an on-timing of the second on-signal before a time from a half of the resonance period to the resonance period from a time when the excitation current becomes zero;
setting an off-timing of the second on-signal to a time until the excitation current becomes zero; and setting an on-period of the second on-signal to half or more of the resonance period between the clamp capacitor and the leakage inductance of the primary winding.

4. The active clamp flyback converter according to claim 2, wherein
the controller performs operations further comprising:
setting an on-timing of the second on-signal before a time from a half of the resonance period to the resonance period from a time when the excitation current becomes zero;
setting an off-timing of the second on-signal to a time until the excitation current becomes zero; and
setting an on-period of the second on-signal to half or more of the resonance period between the clamp capacitor and the leakage inductance of the primary winding.

5. The active clamp flyback converter according to claim 1, wherein
the controller further comprises:
an excitation current detector that detects the excitation current; and
a threshold generator that generates a threshold, wherein
the controller performs operations comprising:
transmitting the second on-signal as the on-timing of the second on-signal when the excitation current detected by the excitation current detector reaches the threshold value generated by the threshold generator.

6. The active clamp flyback converter according to claim 2, wherein
the controller further comprises:
an excitation current detector that detects the excitation current; and
a threshold generator that generates a threshold, wherein
the controller performs operations comprising:
transmitting the second on-signal as the on-timing of the second on-signal when the excitation current detected by the excitation current detector reaches the threshold value generated by the threshold generator.

7. The active clamp flyback converter according to claim 3, wherein
the controller further comprises:
an excitation current detector that detects the excitation current; and
a threshold generator that generate a threshold, wherein
the controller performs operations comprising:
transmitting the second on-signal as the on-timing of the second on-signal when the excitation current detected by the excitation current detector reaches the threshold value generated by the threshold generator.

8. The active clamp flyback converter according to claim 5, wherein
the threshold generator changes the threshold value according to an output voltage.

9. The active clamp flyback converter according to claim 6, wherein
the threshold generator changes the threshold value according to an output voltage.

10. The active clamp flyback converter according to claim 7, wherein
the threshold generator changes the threshold value according to an output voltage.

11. The active clamp flyback converter according to claim 1, wherein the controller performs operations comprising:

setting the on-period of the second on-signal to a half or more of the resonance period between the clamp capacitor and the leakage inductance of the primary winding and below the resonance period; and setting the on-timing of the second on-signal to a time in which an amount of charge of the current flowing in the direction of charging the clamp capacitor is smaller due to the resonant current is limited to the excitation current than a half charge amount of the resonant current flowing in the direction of discharging the clamp capacitor when the clamp switch is turned on by the second on-signal.

12. The active clamp flyback converter according to claim 2, further comprising a current detector that detects the current in a discharging direction and the current in a charging direction flowing from the second on-signal to the clamp capacitor, wherein the controller comprises:

an integrating circuit in which the current in the discharging direction detected by the current detector is integrated to obtain a discharge integral amount, and the current in the charging direction is integrated to obtain the charge integral amount; and a delay circuit that delays the on-timing of the second on-signal so that the charge integral obtained in the integrating circuit is a half or less of the discharge integral amount.

\* \* \* \* \*